United States Patent
Wang et al.

(10) Patent No.: US 10,243,446 B2
(45) Date of Patent: Mar. 26, 2019

(54) CURRENT REFERENCE BASED SELECTIVE HARMONIC CURRENT MITIGATION PULSED WIDTH MODULATION

(71) Applicant: University of Florida Research Foundation, Incorporated, Gainesville, FL (US)

(72) Inventors: Shuo Wang, Gainesville, FL (US); Amirhossein Moeini, Gainesville, FL (US); Hui Zhao, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 0 days.

(21) Appl. No.: 15/887,620

(22) Filed: Feb. 2, 2018

(65) Prior Publication Data
US 2018/0226879 A1   Aug. 9, 2018

Related U.S. Application Data

(60) Provisional application No. 62/455,016, filed on Feb. 6, 2017.

(51) Int. Cl.
*H02M 1/12* (2006.01)
*H02M 7/5395* (2006.01)
(Continued)

(52) U.S. Cl.
CPC ............ *H02M 1/126* (2013.01); *H02J 3/01* (2013.01); *H02M 1/08* (2013.01); *H02M 1/12* (2013.01);
(Continued)

(58) Field of Classification Search
CPC ...................... H02M 2001/0077; H02M 1/12
(Continued)

(56) References Cited

U.S. PATENT DOCUMENTS

2012/0063182 A1* 3/2012 Laforga Gallo ........ H02J 3/386
363/65
2012/0155125 A1* 6/2012 Zhang ...................... H02M 1/44
363/34
(Continued)

OTHER PUBLICATIONS

Dahidah et al., "A review of multilevel selective harmonic elimination PWM: formulations, solving algorithms, implementation and applications," IEEE Transactions on Power Electronics, Sep. 2014, pp. 1-16.
(Continued)

*Primary Examiner* — Gary A Nash
(74) *Attorney, Agent, or Firm* — Alston & Bird LLP

(57) ABSTRACT

Methods and apparatuses for selective harmonic current mitigation pulse width modulation (SHCM-PWM) are provided. Low switching frequencies can be utilized for grid connected cascaded H-bridge multilevel rectifiers to meet harmonic requirements within an extended harmonic spectrum. Instead of using voltage references to calculate switching angles for rectifiers as in conventional selective harmonic elimination-PWM (SHE-PWM) and selective harmonic mitigation-PWM (SHM-PWM), current references can be used to compensate for current harmonics and meet current harmonic requirements and total demand distortion (TDD) within the entire harmonic spectrum.

20 Claims, 21 Drawing Sheets

(51) Int. Cl.
  H02J 3/01    (2006.01)
  H02M 7/49    (2007.01)
  H02M 1/08    (2006.01)
  H02M 7/487   (2007.01)
  H02M 7/483   (2007.01)

(52) U.S. Cl.
  CPC .......... *H02M 7/49* (2013.01); *H02M 7/5395* (2013.01); *H02M 7/487* (2013.01); *H02M 2007/4835* (2013.01)

(58) Field of Classification Search
  USPC ....... 323/242, 246, 283, 285, 288; 363/21.1, 363/21.11, 21.18, 65, 78, 79
  See application file for complete search history.

(56) References Cited

U.S. PATENT DOCUMENTS

| | | | |
|---|---|---|---|
| 2012/0275196 A1* | 11/2012 | Chapman ................ | H02J 3/383 363/17 |
| 2015/0349629 A1* | 12/2015 | Wu .......................... | H02M 1/00 323/205 |

OTHER PUBLICATIONS

Moeini et al., "DC link voltage balancing approach for cascaded H-bridge active rectifier based on selective harmonic elimination-pulse width modulation," IET Power Electronics, Apr. 2015, pp. 583-590, vol. 8, No. 4.
Zhao et al., "A real-time selective harmonic elimination based on a transient-free inner closed-loop control for cascaded multilevel inverters," IEEE Transactions on Power Electronics, Feb. 2016, pp. 1000-1014, vol. 31, No. 2.
Sharifzadeh et al., "Hybrid SHM-SHE pulse amplitude modulation for high power four-leg inverter," IEEE Transactions on Industrial Electronics, Mar. 2016, pp. 1-9.
Buccella et al., "Analytical method for pattern generation in five-level cascaded h-bridge inverter using selective harmonic elimination," IEEE Transactions on Industrial Electronics, Nov. 2014, pp. 5811-5819, vol. 61, No. 11.
Pulikanti et al., "Hybrid seven-level cascaded active neutral-point-clamped-based multilevel converter under SHE-PWN," IEEE Transactions on Industrial Electronics, Nov. 2013, pp. 4794-4804, vol. 60, No. 11.
Franquelo et al., "A flexible selective harmonic mitigation technique to meet grid codes in three-level PWM converters," IEEE Transactions on Industrial Electronics, Dec. 2007, pp. 1-7.
Napoles et al., "Selective harmonic mitigation technique for cascaded h-bridge converters with nonequal DC link voltages," IEEE Transactions on Industrial Electronics, May 2013, pp. 1963-1971, vol. 60, No. 5.
Napoles et al., "Selective harmonic mitigation technique for high-power converters," IEEE Transactions on Industrial Electronics, Jul. 2010, pp. 2315-2323, vol. 57, No. 7.
Dabbaghjamanesh et al., "High performance control of grid connected cascaded h-bridge active rectifier based on type II-fuzzy logic controller with low frequency modulation technique," International Journal of Electrical and Computer Engineering, Apr. 2016, pp. 484-494, vol. 6, No. 2.
"IEEE recommended practices and requirements for harmonic control in electrical power systems," IEEE Std 619-1992, Apr. 1993, pp. 1-100.
Reyes-Sierra et al., "Multi-objective particle swarm optimizers: a survey of the state-of-the-art," International Journal of Computational Intelligence Research, Jan. 2006, pp. 287-308, vol. 2, No. 3.
Wang et al., "Investigating the power architectures and circuit topologies for megawatt superfast electric vehicle charging stations with enhanced grid support functionality," IEEE International Electric Vehicle Conference, Mar. 2012, pp. 1-8.
Watson et al., "A complete harmonic elimination approach to DC link voltage balancing for a cascaded multilevel rectifier," IEEE Transactions on Industrial Electronics, Dec. 2007, pp. 2946-2953, vol. 54, No. 6.
Agelidis et al., "A five-level symmetrically defined selective harmonic elimination PWM strategy: analysis and experimental validation," IEEE Transactions on Power Electronics, Jan. 2008, pp. 19-26, vol. 23, No. 1.
Marzoughi et al., "An optimal selective harmonic mitigation technique for high power converters," International Journal of Electrical Power and Energy Systems, Jul. 2013, pp. 34-39, vol. 49.
Najjar et al., "Optimal selective harmonic mitigation technique on variable DC link cascaded H-bridge converter to meet power quality standards," IEEE Journal of Emerging and Selected Topics in Power Electronics, Sep. 2016, pp. 1107-1116, vol. 4, No. 3.
Moeini et al., "Asymmetric selective harmonic elimination technique using partial derivative for cascaded modular active rectifiers tied to a power grid with voltage harmonics," 7th Asia Pacific International Symposium on Electromagnetic Compatibility, May 2016, pp. 982-987.
V. G. Agelidis, A. I. Balouktsis and C. Cossar, "On Attaining the Multiple Solutions of Selective Harmonic Elimination PWM Three-Level Waveforms Through Function Minimization," IEEE Trans. Ind. Electron, vol. 55, No. 3, pp. 996-1004, March 2008.

\* cited by examiner

CURRENT REFERENCE BASED SELECTIVE HARMONIC CURRENT MITIGATION PULSED WIDTH MODULATION

CROSS-REFERENCE TO RELATED APPLICATION

This application claims the benefit of U.S. Provisional Application Ser. No. 62/455,016, filed Feb. 6, 2017, which is incorporated herein by reference in its entirety, including any figures, tables, and drawings.

GOVERNMENT SUPPORT

This invention was made with government support under grant number 1540118 awarded by the National Science Foundation. The government has certain rights in the invention.

BACKGROUND

Renewable energy sources and electric vehicles are poised to become increasingly important to our daily lives. In order to transfer power from renewable energy sources to the power grid, and from the grid to electric vehicles, converters and rectifiers are necessary, as are methods and apparatuses for power modulation. Therefore, there is a continued demand for more effective methods of power modulation as well as apparatuses that can implement such methods.

BRIEF SUMMARY

Embodiments of the subject invention include methods and apparatuses for selective harmonic current mitigation pulse width modulation (SHCM-PWM). Methods of the subject invention can have low switching frequencies and can be applied to grid connected cascaded H-bridge multilevel rectifiers to fully meet harmonic requirements within an extended harmonic spectrum.

In an embodiment of the subject invention, instead of using the voltage references to calculate switching angles for a rectifier, as in conventional selective harmonic elimination-PWM (SHE-PWM) or selective harmonic mitigation-PWM (SHM-PWM), current references can be used to compensate for current harmonics. The current harmonics may be a result of grid voltage harmonics and rectifier input voltage harmonics. Embodiments of the subject invention can allow for the current harmonic requirements and total demand distortion (TDD) to be satisfied within the entire harmonic spectrum. With the same switching frequency, embodiments of the subject invention (including SHCM-PWM methods) can have smaller coupling inductances to meet higher orders of current harmonic requirements than conventional SHE-PWM techniques.

DETAILED DESCRIPTION

Figure 1:
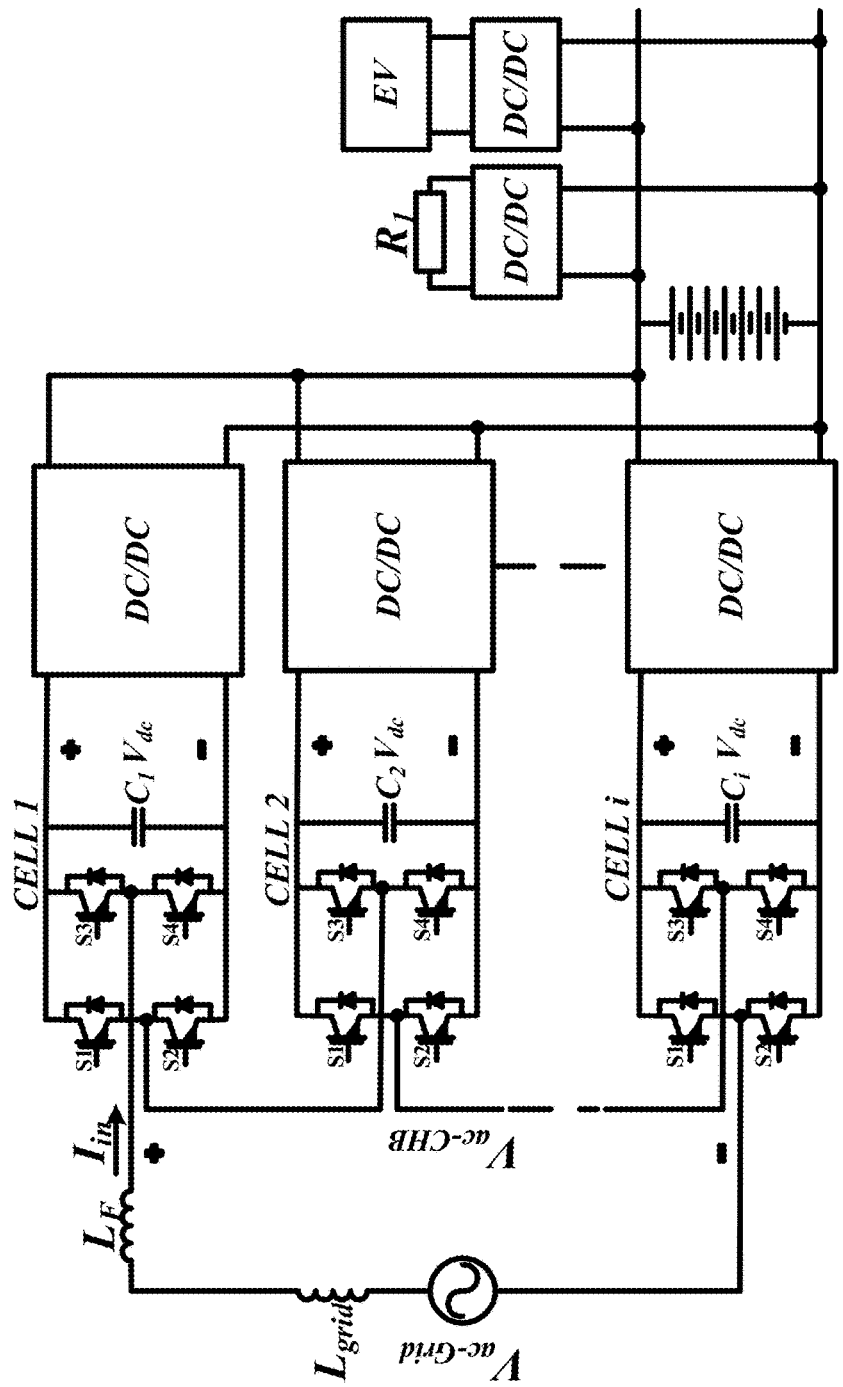
FIG. 1 shows the configuration of an i-cell, (2i+1)-level single-phase grid connected CHB converter.

The Cascaded H-bridge (CHB) topology plays an important role in high power electronics applications due to its low total harmonic distortion (THD), low electromagnetic interference and high efficiency. FIG. 1 shows a grid tied, i-cell CHB AC/DC rectifier that has 2×i+1 output voltage levels.

The grid voltage is $V_{ac\text{-}Grid}$. The input voltage of the CHB is $V_{ac\text{-}CHB}$, which is equal to the sum of the input voltages of all H-bridge cells. The current $I_{in}$ flows from the power grid to the CHB through two inductances, line inductance $L_{grid}$, and the inductance $L_f$ of the coupling (filtering) inductor. The total inductance between the grid voltage source $v_{ac\text{-}Grid}$ and the CHB rectifier is $L_T=L_{grid}+L_f$. The DC link voltages are equal to $V_{dc}$. The isolated DC/DC converters are connected to these DC links. The outputs of DC/DC converters are paralleled to charge energy storage on a DC bus. The loads, such as resistive load $R_1$ and electric vehicle (EV) charging load, are connected to the DC bus through bidirectional DC/DC converters. The DC link voltage, which has the 2nd order harmonic voltage ripple, of each H-bridge cell can be regulated either with a CHB DC link voltage balancing strategy or via isolated bidirectional DC/DC rectifiers. Because voltage balancing and the reduction of the 2nd order harmonics on DC links are not the focus of the subject invention, they will not be thoroughly discussed. Because of this, the DC link of each CHB cell will be assumed to be connected to a constant DC voltage source $V_{dc}$. However, this does not negate or invalidate the principles and methods of the subject invention that will be discussed.

The modulation techniques were developed for CHB based power converters/inverters to meet not only the high efficiency requirements but also the power quality requirements. There are two existing optimal modulation techniques, selective harmonic elimination (SHE) and selective harmonic mitigation (SHM).

The transcendental equations have been solved in the SHE-PWM approaches to reduce low order harmonics. Although the techniques have high efficiency working at low switching frequencies, where the switching frequency is defined as the product of the number of switching transitions of each cell within one-quarter line period and the line frequency, the number of harmonics that can be eliminated is limited by the switching frequencies. For example, the maximum current harmonic order that can be eliminated is the 25th when the switching frequency is three times the line frequency in a 3-cell, 7-level, 3-phase CHB power rectifier. However, in order to meet the current harmonic requirements, extra passive filters are needed. In addition, the influence of inductance $L_F$ on the elimination or mitigation of current harmonics and the design techniques for inductance $L_F$ have not been well investigated.

Optimal SHM-PWM has been introduced for DC/AC multilevel inverters. One advantage of the subject invention is that it can mitigate higher order harmonics than conventional SHE-PWM with the same switching frequencies because it only needs to reduce the harmonics below the standards rather than eliminating them. Moreover, reducing the total harmonic distortion (THD) is also one of the targets of SHM-PWM, but not SHE-PWM. Finally, the conventional optimal SHM-PWM technique reduces current harmonics by reducing voltage harmonics of the CHB inverter, so it cannot reduce the current harmonics due to grid voltage harmonics.

An unequal DC link technique can be used for SHM-PWM DC/AC cascaded inverters to reduce a higher number of harmonics with minimized switching frequencies. However, the same issues in conventional SHM-PWM still exist.

A technique to obtain multiple SHE-PWM solutions has been proposed. This technique can find the optimized solutions to eliminate harmonics up to 19th order with a 3-cell inverter; however, it cannot meet the standards within a full spectrum range and eliminate the current harmonics generated by grid voltage harmonics.

SHE-PWM techniques and conventional phase shift PWM (PSPWM) techniques have been compared in CHB inverter applications. It has shown that the SHE-PWM technique can eliminate a much higher number of harmonics than conventional PSPWM techniques with the same number of switching frequencies. To improve energy efficiency, low-frequency modulation techniques such as SHE-PWM or SHM-PWM may be explored instead of PSPWM for high power multilevel converters.

Embodiments of the subject invention include selective harmonic current mitigation-PWM (SHCM-PWM) techniques for grid tied CHB multilevel AC/DC rectifiers (converters) to meet the harmonic standards, such as IEEE-519 current distortion and total demand distortion (TDD) requirements. Compared with the existing SHM-PWM or SHE-PWM, embodiments of the subject invention can have the following advantages. Embodiments of the subject invention (which may be referred to as SHCM-PWM) can be directly applied to the currents $I_{in}$ of grid tied CHB AC/DC rectifiers; therefore the current harmonics due to grid voltage harmonics can be mitigated to below IEEE-519 current distortion limits. In contrast, existing SHM-PWM or SHE-PWM cannot reduce current harmonics resulting from grid voltage harmonics. Embodiments of the subject invention can mitigate higher order current harmonics based on the harmonic distortion percentage and total demand distortion (TDD) limits defined in IEEE-519 better than existing SHM-PWM or SHE-PWM with the same number of switching frequencies (transitions). Finally, the influence of the coupling inductance $L_F$ on the SHE-PWM, SHM-PWM and SHCM-PWM in a CHB active rectifier and the coupling inductance design will be discussed. It will be shown that the subject invention can meet both harmonic and TDD limits with less coupling inductance than SHE-PWM and SHM-PWM. The techniques of the subject invention can therefore reduce the cost and size of passive filters.

Both SHE-PWM and SHM-PWM techniques control switching angles to reduce low order voltage harmonics of the CHB. SHE-PWM and SHM-PWM use Fourier series to obtain harmonic equations for $V_{ac\text{-}CHB}$. In FIG. 1, the inductance $L_T$, which is equal to the sum of $L_f$ and $L_{grid}$, between the equivalent grid voltage source $V_{ac\text{-}grid}$ and the CHB rectifier is designed to help reduce current harmonics. The voltages and currents on the AC side of the single-phase CHB active rectifier are, $$V_{ac-Grid-h} = j\omega h L_T I_{in-h} + V_{ac-CHB-h}, h = 1, 3, 5 \ldots. \quad (1)$$

$$|I_{in-h}| = \left| \frac{V_{ac-Grid-h} - V_{ac-CHB-h}}{\omega h L_T} \right| \quad (2)$$

where, when h=1, $V_{ac\text{-}Grid\text{-}1}$, $V_{ac\text{-}CHB\text{-}1}$ and $I_{in\text{-}1}$ are the fundamental grid voltage, the fundamental input voltage and the fundamental input current of the CHB active rectifier, respectively. When h>1, $V_{ac\text{-}Grid\text{-}h}$, $V_{ac\text{-}CHB\text{-}h}$, and $I_{in\text{-}h}$ are the grid voltage harmonics, input voltage harmonics, and input current harmonics, respectively. Equation (2) is the magnitude of the current harmonics flowing to the rectifier.

Figure 2:
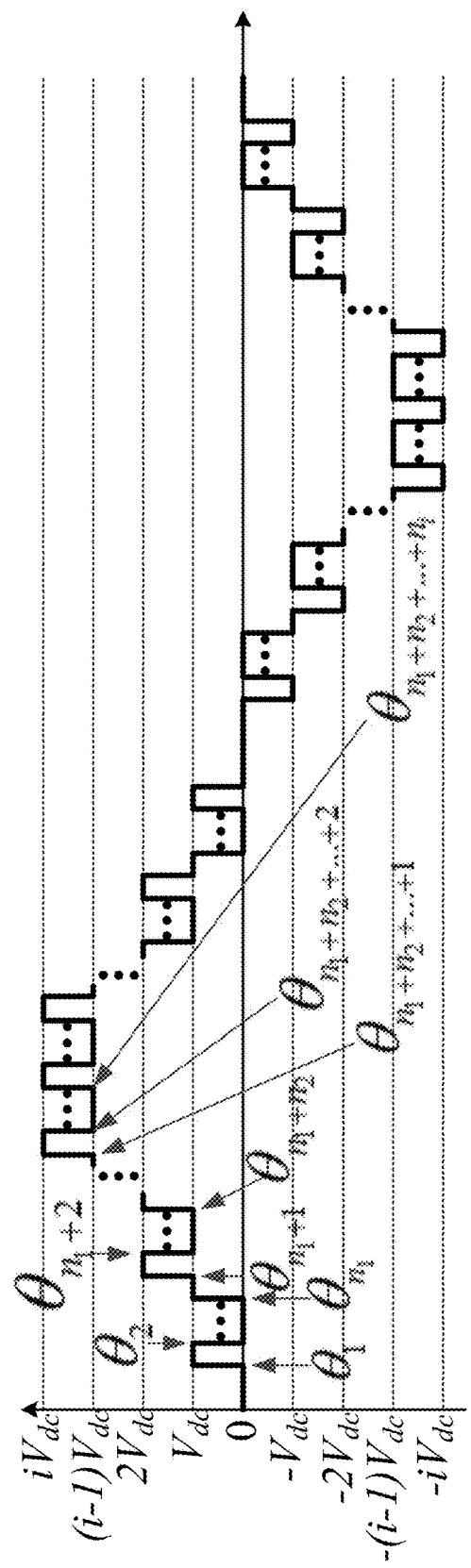
FIG. 2 shows the voltage waveform of a connected cascaded H-bridge (CHB) active rectifier using the selective harmonic elimination pulse width modulation (SHE-PWM), selective harmonic mitigation pulse width modulation (SHM-PWM), or selective harmonic current mitigation pulse width modulation (SHCM-PWM) techniques.

For the $V_{ac\text{-}CHB}$ waveform in FIG. 2, the number of switching transitions in a quarter line period of the $k^{th}$ cell is $n_k$, k=1 . . . i. and the total number of switching transitions in a quarter line period is equal to $K=n_1+n_2+n_3+\ldots+n_i$. Also, h is the harmonic order and $\theta_1, \theta_2, \ldots, \theta_K$, are the switching angles.

In conventional SHE-PWM, the grid voltage is considered to have zero harmonics. And, based on Fourier theory and the $V_{ac\text{-}CHB}$ waveform in FIG. 2, equation (1) can be rewritten as, $$\begin{cases} j\omega L_T I_{in\text{-}h} + V_{ac\text{-}CHB\text{-}h} = 0 \Rightarrow I_{in\text{-}h} = \frac{-V_{ac\text{-}CHB\text{-}h}}{j\omega h L_T}, \text{ for } h = 3, 5, \ldots \\ V_{ac\text{-}CHB} = \sum_{h=1}^{\infty} \frac{4V_{dc}}{\pi h}(a_h\cos(h\omega t) + b_h\sin(h\omega t)), \\ a_h = (-\sin(h\theta_1) + \sin(h\theta_2) - \ldots - \sin(h\theta_K)), \\ b_h = (\cos(h\theta_1) - \cos(h\theta_2) + \ldots + \cos(h\theta_K)), \end{cases} \quad (3)$$

In equation (3), the $V_{ac\text{-}CHB\text{-}h}$ is the $h^{th}$ voltage harmonic of the CHB active rectifier and it is determined by $a_h$ and $b_h$. Because the waveform in FIG. 2 has quarter wave symmetry, the $a_h$ and even order of $b_h$ are equal to zero. The modulation index of $V_{ac\text{-}CHB}$ is defined as, $$M_a = (\cos(\theta_1) - \cos(\theta_2) + \ldots + \cos(\theta_K)) \quad (4)$$

Furthermore, if $h \leq 2K-1$, all of the low order harmonics $V_{ac\text{-}CHB\text{-}3}, V_{ac\text{-}CHB\text{-}5}, V_{ac\text{-}CHB\text{-}7}, \ldots, V_{ac\text{-}CHB\text{-}h}$ are equal to zero when SHE-PWM is applied. The equation for the voltage harmonics that can be eliminated in $V_{ac\text{-}CHB\text{-}h}$ can be represented by, $$|V_{ac\text{-}CHB\text{-}h}| = \quad (5)$$

$$\frac{4V_{dc}}{\pi h}|\cos(h\theta_1) - \cos(h\theta_2) + \cos(h\theta_3) + \ldots + \cos(h\theta_K)| = 0$$

$$h = 3, 5, \ldots 2K-1$$

Equation (5) shows the harmonics that can be eliminated in FIG. 2 with SHE-PWM. As shown in (5), the order of harmonics which can be eliminated by the SHE-PWM in a single phase system is equal to $h=2K-1$. As a result, with the SHE-PWM technique, when the grid has no voltage harmonics, the current harmonics in (3) can be written as;

$$I_{in\text{-}h} = \begin{cases} 0, & 3 \leq h \leq 2K-1 \\ -\frac{V_{ac\text{-}CHB\text{-}h}}{j\omega h L_T}, & h > 2K-1, \end{cases} \quad (6)$$

In equation (6), because the objective of SHE-PWM is to eliminate $V_{ac\text{-}CHB\text{-}h}$, it is defined as voltage reference modulation technique. There are three issues for the conventional voltage reference SHE-PWM: (1) the effect of the grid voltage harmonics on $I_{in\text{-}h}$ was not considered, but the current harmonics generated by grid voltage harmonics could be higher than current harmonic limits; (2) when $h>2K-1$, the magnitudes of $I_{in\text{-}h}$ can be higher than the current harmonic limits; and (3) the inductance $L_T$ design and its effect on harmonic elimination are not investigated.

SHM-PWM techniques for CHB inverters use voltage equation (7) to control switching angles. Instead of eliminating each harmonic, $V_{ac\text{-}CHB\text{-}h}$ can be mitigated as in Equation (7), below.

$$|V_{ac\text{-}CHB\text{-}h}| = \quad (7)$$

$$\frac{4V_{dc}}{h\pi}|\cos(h\theta_1) - \cos(h\theta_2) + \cos(h\theta_3) + \ldots + \cos(h\theta_K)| \leq l_h \frac{4V_{dc}M_a}{\pi},$$

$$h = 3, 5, \ldots$$

In equation (7), $l_h$ is the voltage harmonic limit which is defined by the power quality standards. Moreover, the total harmonic distortion (THD) equation of $V_{ac\text{-}CHB}$ can be controlled using equation (8) by changing the harmonic voltage $V_{ac\text{-}CHB\text{-}h}$, $$THD = \quad (8)$$

$$\frac{\sqrt{|V_{ac\text{-}CHB\text{-}3}|^2 + |V_{ac\text{-}CHB\text{-}5}|^2 + |V_{ac\text{-}CHB\text{-}7}|^2 + \ldots + |V_{ac\text{-}CHB\text{-}\infty}|^2}}{\frac{4V_{dc}}{\pi}M_a}$$

By reducing the voltage harmonics below the limit $l_h$ instead of eliminating them, SHM-PWM techniques can reduce higher orders of harmonics than SHE-PWM with the same number of switching frequencies (transitions). Because of this, the SHM-PWM technique is more efficient than SHE-PWM. The issue with SHM-PWM is that it does not always meet current harmonic requirements as it takes voltage limits as its reference, and it cannot reduce the current harmonics due to grid voltage harmonics. Furthermore, it does not consider the effects of $L_T$ on $I_{in\text{-}h}h$. Techniques of embodiments of the subject invention, which may be referred to as SHCM-PWM, can extend SHM-PWM to rectifiers and make further improvements over the prior art.

Figure 3:
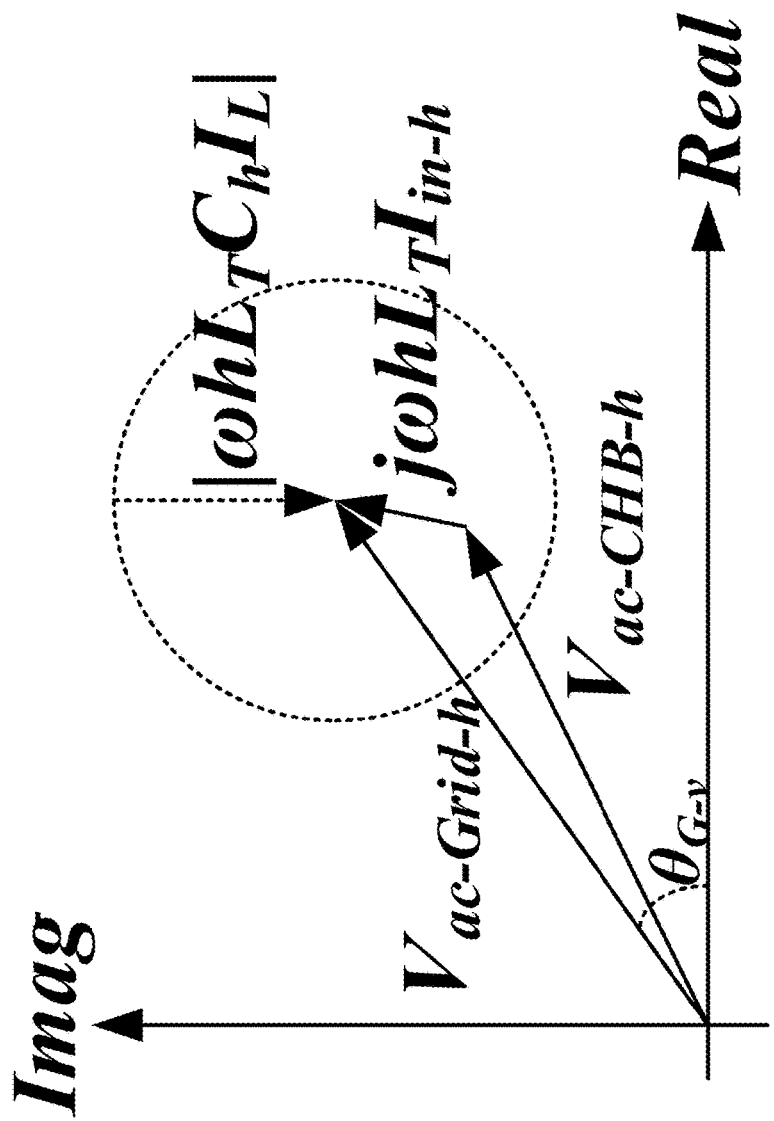
FIG. 3 shows the phasor diagram of equation (1).

Although SHM-PWM can control more orders of voltage harmonics than SHE-PWM techniques, its objective is still to meet the voltage harmonic limits instead of current harmonic limits. At the same time, the current harmonics need to meet harmonic limits for most applications such as grid tied converters or inverters. According to the subject invention, instead of using the voltage limits to control $V_{ac\text{-}CHB\text{-}h}$, the harmonic current limits can be used in equation (2) to control CHB's current harmonics due to both the grid voltage and CHB voltage harmonics. The phasor diagram of equation (1) is shown in FIG. 3. The difference between the grid voltage harmonic $V_{ac\text{-}Grid\text{-}h}$ and the CHB rectifier input voltage harmonic $V_{ac\text{-}CHB\text{-}h}$ determines the voltage drop $j\omega h L_T I_{in\text{-}h}$ on the inductor. In order to analyze the worst case scenario, the voltage harmonics of grid voltage $V_{ac\text{-}Grid\text{-}h}$ should equal the maximum allowed voltage harmonic limit in IEEE-519, which is 3% of the fundamental voltage. Significant voltage harmonics exist even at the utility voltage level (120V/220V), as will be shown in the experimental section of this application. Because all current harmonics generate voltage drops on inductor $L_T$, and all current harmonics must meet IEEE-519 current harmonic limits, the highest allowable voltage drop of the $h^{th}$ order current harmonic $I_{in\text{-}h}^h$ on inductor $L_T$ can be determined as $\omega h L_T C_h I_L$, where, $C_h$ is the current harmonic requirements of IEEE-519 and $I_L$ is the maximum rectifier load current defined in the IEEE-519.

Because the phases of these voltage drops due to current harmonics can be any angle from 0 to $2\pi$ and the actual voltage drop of the $h^{th}$ order current harmonic $I_{in\text{-}h}^h$ should be smaller than $\omega h L_T C_h I_L$ to meet the current harmonic limits, the range of the inductor voltage drop due to the harmonic current $I_{in\text{-}h}$ which meets current harmonic limit is a circle with radius equal to $\omega h L_T C_h I_L$, and it centers at the end of $V_{ac\text{-}Grid\text{-}h}$, as shown in FIG. 3. If $V_{ac\text{-}CHB\text{-}h}$ is inside the circle, the difference $\omega h L_T I_{in\text{-}h}$ between the grid voltage harmonic $V_{ac\text{-}Grid\text{-}h}$ and CHB voltage harmonic $V_{ac\text{-}CHB\text{-}h}$ meets condition (9), $$|\omega h L_T I_{in\text{-}h}| \leq |\omega h L_T C_h I_L|. \quad (9)$$

In other words, with the $h^{th}$ order CHB voltage harmonic $V_{ac\text{-}CHB\text{-}h}$ and the $h^{th}$ order grid voltage harmonic $V_{ac\text{-}Grid\text{-}h}$, the current harmonic $I_{in\text{-}h}$ can meet the current harmonic limit. In FIG. 3, $C_h$ is determined by IEEE-519. The radius of the circle of each order harmonic depends only on the inductance $L_T$ if the load current $I_L$ of the CHB active rectifier and the grid voltage frequency $\omega$ are known. Two examples will now be analyzed, a low inductance example as shown in FIGS. 4 (a) and (b), and a large inductance example as shown in FIGS. 5 (a) and (b).

Figure 4:
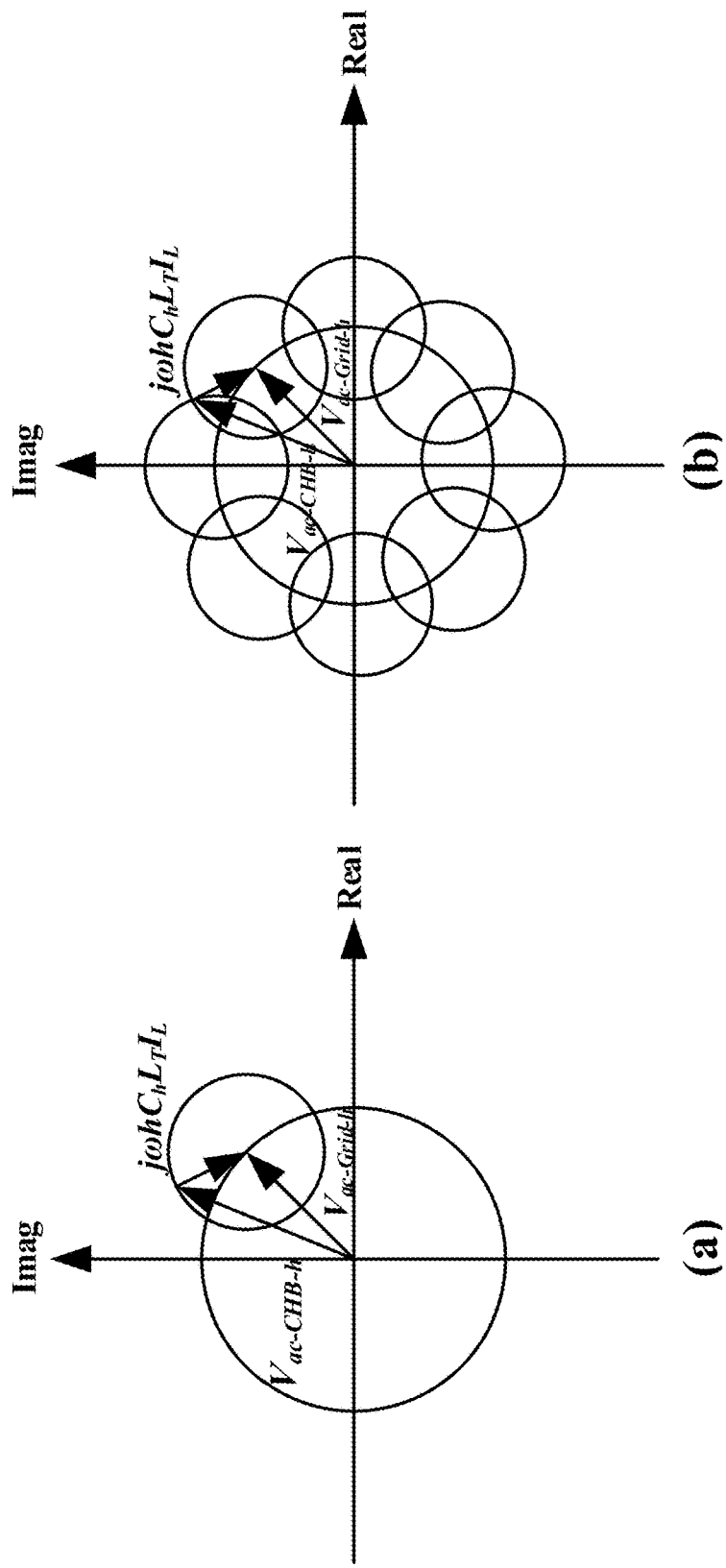
FIG. 4 shows the phasor diagram of the $V_{ac\text{-}Grid\text{-}h}$+ $j\omega hL_T I_{in\text{-}h}$ with a small $L_T$ and a harmonic limit circle (a) for a specific case, and (b) when grid voltage phases varies from 0 to $2\pi$.
Figure 5:
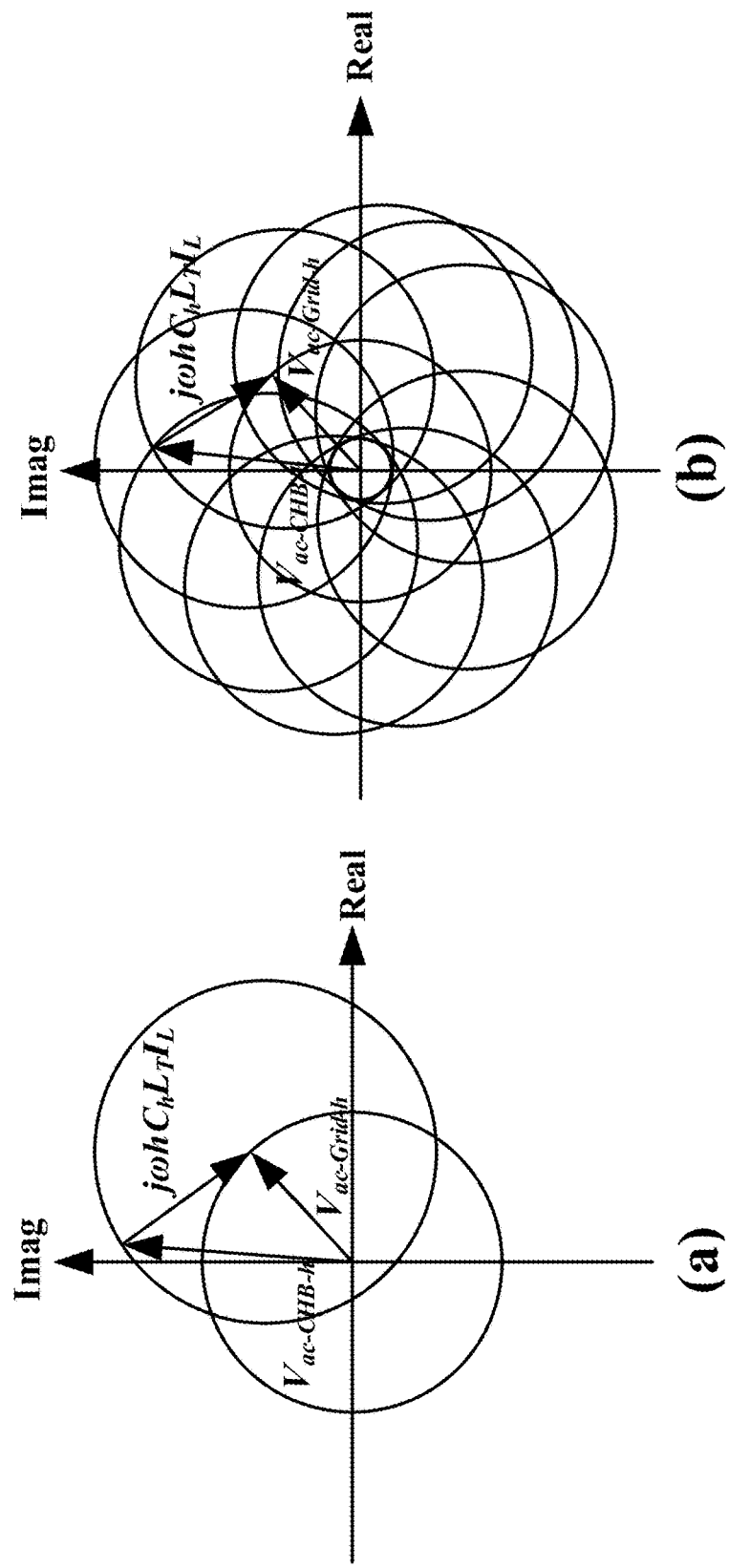
FIG. 5 shows the phasor diagram of the $V_{ac\text{-}Grid\text{-}h}$+ $j\omega hL_T I_{in\text{-}h}$ with a big $L_T$ (a) for a specific case, and (b) when grid voltage phases vary from 0 to $2\pi$.

Because the phase angles of $V_{ac\text{-}Grid\text{-}h}$ and $V_{ac\text{-}CHB\text{-}h}$ vary from 0 to $2\pi$, FIGS. 4 (a) and (b) show the phasor diagram of the grid voltage harmonics $V_{ac\text{-}Grid\text{-}h}$ and the voltage drop of the inductor $\omega h L_T I_{in\text{-}h}$, when the inductance is small. To meet the current harmonic requirements, the CHB voltage must generate voltage vectors located inside the dash-line boundary circle. The boundary circle has a radius equal to $\omega h L_T C_h I_L$ and centers on another circle and has a radius determined by $V_{ac\text{-}Grid\text{-}h}$. In FIG. 4 (b), to meet the limits, $V_{ac\text{-}CHB\text{-}h}$ must be solved for all possible phases of the grid voltage harmonics and the solutions are stored in a lookup table (LUT), so the LUT should have enough space to store all data.

In equation (6), for the SHE-PWM, the CHB rectifier generates zero voltage harmonics below the order of 2K-1. Therefore, the $V_{ac\text{-}Grid\text{-}h}$ contributions to $I_{in\text{-}h}$ and $I_{in\text{-}h}$ can be higher than the limit $C_h I_L$ defined in IEEE-519. The voltage drop of the $I_{in\text{-}h}$ on the inductor is equal to $V_{ac\text{-}Grid\text{-}h}$. It can be higher than the $\omega h L_T C_h I_L$, which is the voltage drop of the harmonic current limit on the inductor. This can be described in (10) and (11), $$I_{in-h} = \frac{|V_{ac-Grid-h}|}{|\omega h L_T|} \geq C_h I_L \quad (10)$$

$$|V_{ac-Grid-h}| = \omega h L_T I_{in-h} \geq \omega h L_T C_h I_L \quad (11)$$

If LT is smaller than the critical inductance $L_{crt\text{-}h}$ as shown in equation (12), the harmonics cannot meet the limits.

$$L_T \leq L_{crt-h} = \frac{|V_{ac-Grid-h}|}{\omega h C_h I_L} \quad (12)$$

As shown in equation (12), if the inductance is smaller than $L_{crt\text{-}h}$, it is impossible to meet IEEE-519 using SHE-PWM. Similarly, for the SHM-PWM and SHCM-PWM, if the inductance is smaller than $L_{crt\text{-}h}$, because it is impossible to control the phase of the $V_{ac\text{-}CHB\text{-}h}$, the harmonics cannot meet the limits too As shown in FIG. 5 (a), if $L_T$ is bigger than the critical inductance $L_{crt\text{-}h}$ as shown in equation (13), the circle of the voltage drop contains the origin of the plane.

$$L_T \geq \frac{|V_{ac-Grid-h}|}{\omega h C_h I_L} = L_{crt-h} \quad (13)$$

Because of this, as shown in FIG. 5 (b), when grid voltage phases vary from 0 to $2\pi$, there is a small circle centering the origin (i.e., the safe circle). Inside the safe circle, $V_{ac\text{-}CHB\text{-}h}$ does not need to consider phase to meet the current harmonic limits. The radius $r_h$ of the safe circle is, $$r_h = |\omega h L_T C_h I_L| - |V_{ac-Grid-h}| \quad (14)$$

Based on the analysis above, for SHE-PWM with inductance $L_T$ greater than $L_{crt\text{-}h}$, the $V_{ac\text{-}CHB\text{-}h}$ is zero so it is always within the safe circle when the harmonic order is less than 2K-1. For the harmonic orders higher than 2K-1, the CHB voltage harmonics cannot be eliminated and the current harmonics can exceed the limits. Also, the $V_{ac\text{-}CHB\text{-}h}$ for the SHM-PWM, when the voltage harmonic requirements (such as voltage distortion requirements in IEEE 519) are met based on equation (7), can be illustrated by the dashed circle region in FIG. 6. Because the radius of dash circle depends on the harmonic standard, it can be higher than $r_h$ in equation (14). As a result, the SHM-PWM technique may not meet the standard even for low order harmonics. Because of this, SHE-PWM is better than SHM-PWM when grid voltage harmonics are present. On the other hand, the current reference based SHCM-PWM can generate $V_{ac\text{-}CHB}$ inside the small red safe circle when grid voltage harmonics are present. Because at high order harmonics the optimization range is increased for mitigation techniques, the number of CHB voltage harmonics that can be mitigated to be within the safe circle is much higher than that with SHE-PWM and SHM-PWM. Consequently, although when $L_T$ is smaller than $L_{crt\text{-}h}$, SHE-PWM, SHM-PWM and SHCM-PWM may not be able to reduce the current harmonics resulting from grid voltage harmonics with magnitudes equal to the limits of IEEE 519 to below the current limits. However, SHCM-PWM can mitigate higher order of harmonics to below the limits than SHE-PWM and SHM-PWM when $L_T$ is bigger than $L_{crt\text{-}h}$.

Figure 7:
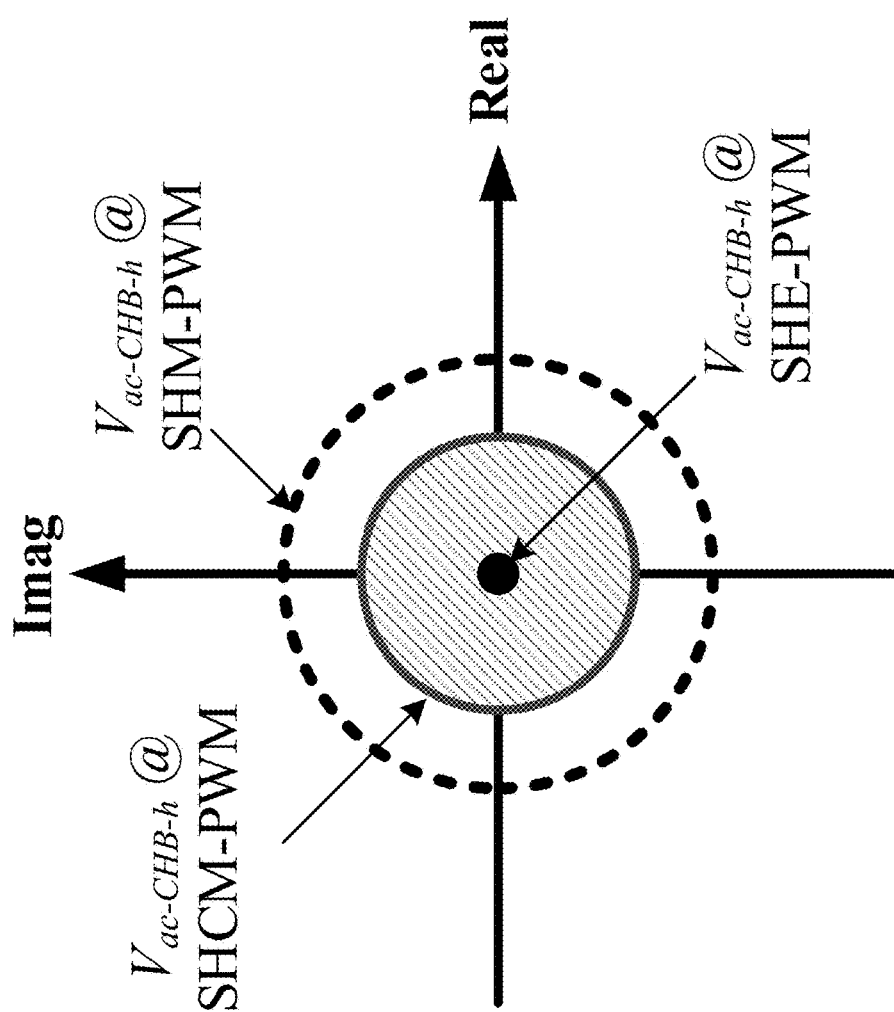
FIG. 7 shows a comparison of SHE-PWM, SHM-PWM and SHCM-PWM to generate $V_{ac\text{-}CHB\text{-}h}$ in order to meet current harmonic limits with a large $L_T$.

FIG. 7 also shows a comparison between SHE-PWM, SHM-PWM, and SHCM-PWM techniques to generate $V_{ac\text{-}CHB\text{-}h}$. As previously discussed, to meet the requirements of IEEE 519 for the $h^{th}$ order harmonic without controlling the phases of CHB voltage (when $L_T \geq L_{crt\text{-}h}$), the $V_{ac\text{-}CHB\text{-}h}$ must be inside the red safe circle in FIG. 7. For the SHE-PWM technique, to eliminate low order harmonics, the $V_{ac\text{-}CHB\text{-}h}$, the black dot at the origin of the plane in FIG. 7 is close to the origin of the plane. As a result, the low order harmonics can meet the current harmonic limits; however, the non-eliminated high order harmonics can be outside of the safe circle. For the SHM-PWM technique, the voltage harmonic limits instead of current harmonic limits are used. These voltage harmonic limits (dashed circle) can be outside the safe circle (shaded circle), as shown in FIG. 7. Hence, even for low order harmonics, the SHM-PWM may not meet the current harmonic limits. On the other hand, for embodiments of the subject invention having the SHCM-PWM technique, the $V_{ac\text{-}CHB\text{-}h}$ can always be inside the safe circle. Therefore, the $I_{in\text{-}h}$ can always meet the current harmonic limits.

Simulations were conducted to validate the techniques of embodiments of the subject invention. In the simulations, the magnitudes of the grid harmonic voltages were the same as the voltage limit of IEEE-519 (the worst scenario), and the phases of grid voltage harmonics changed from 0 to $2\pi$. The 3rd order harmonics were investigated as an example, but the verification can be applied to other orders of harmonics. The circuit parameters of the CHB active rectifier used in the simulations are in Table I.

In FIG. 4 (a) and FIG. 5 (a), within the boundary circle, $$V_{ac\text{-}CHB\text{-}h} = |V_{ac\text{-}Grid\text{-}h}| \angle \theta_{Gv\text{-}h} - |\omega h L_T I_{in\text{-}h}| \angle (\theta_{iCHB\text{-}h} + 90°) \quad (15)$$

where, $I_{in\text{-}h} < C_h I_L$; the $\theta_{Gv\text{-}h}$ and $\theta_{iCHB\text{-}h}$ are the phases of the grid harmonic voltage $V_{ac\text{-}Grid\text{-}h}$ and harmonic current $I_{in\text{-}h}$, respectively. The real component $a_{Vac\text{-}CHB\text{-}h}$ and imaginary component $b_{Vac\text{-}CHB\text{-}h}$ of the $h^{th}$ CHB voltage harmonic within the boundary circle in (15) can be written as, $$a_{V_{ac\text{-}CHB\text{-}h}} = |V_{ac\text{-}Grid\text{-}h}|\cos(\theta_{Gv\text{-}h}) - |\omega h L_T I_{in\text{-}h}|\cos(\theta_{iCHB\text{-}h}+90°)$$

$$b_{V_{ac\text{-}CHB\text{-}h}} = |V_{ac\text{-}Grid\text{-}h}|\sin(\theta_{Gv\text{-}h}) - |\omega h L_T I_{in\text{-}h}|\sin(\theta_{iCHB\text{-}h}+90°) \quad (16)$$

TABLE I

CIRCUIT PARAMETERS OF THE GRID CONNECTED CHB RECTIFIER

| Parameter | Symbol | Value |
|---|---|---|
| Line frequency | f | 60 Hz |
| AC grid Voltage (RMS) | $V_{ac}$ | 110 V |
| Rectifier total power | $P_{total}$ | 1.5 kW |
| Maximum Demand Load (RMS) | $I_L$ | 14.14 A |

Figure 8:
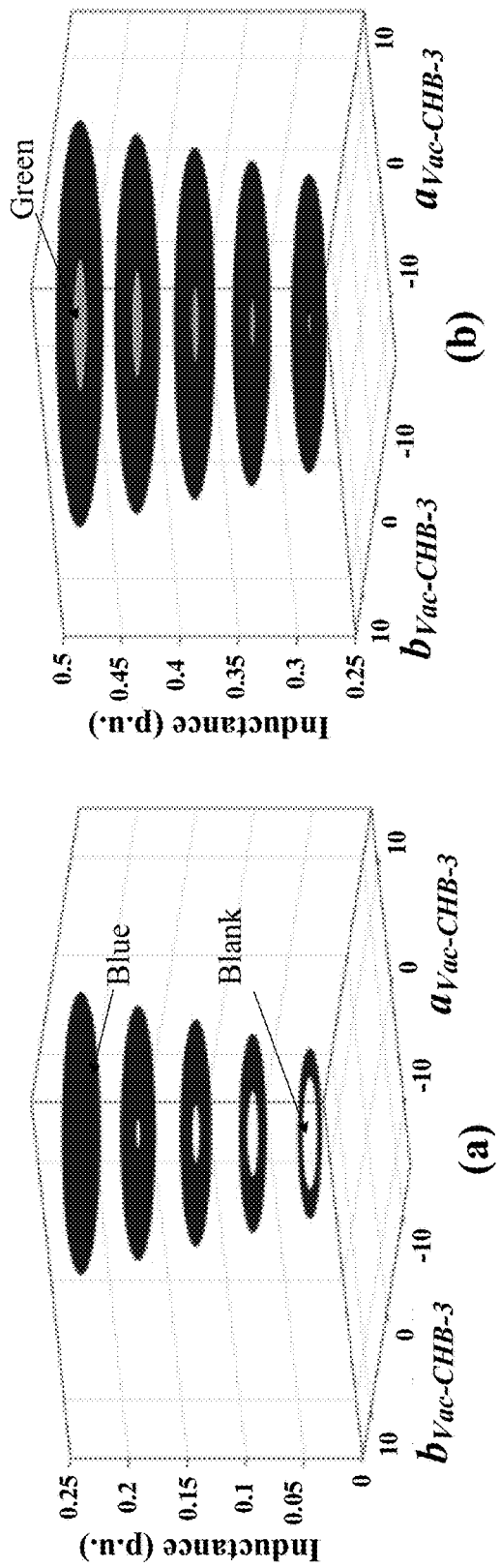
FIG. 8 shows the solutions $a_{V_{ac\text{-}CHB\text{-}3}}$ and $b_{V_{a\text{-}CHB\text{-}3}}$ of the $3^{rd}$ order CHB voltage $V_{ac\text{-}CHB\text{-}3}$ in (16): (a) for the inductance from 0.0485 to 0.25 p.u., and (b) for the inductance from 0.25 to 0.485 p.u.

By sweeping $I_{in\text{-}h}$ from 0 to $C_h I_L$, sweeping $L_T$ from 1 mH (0.0485 p.u.) to 10 mH (0.485 p.u.), sweeping $\theta_{Gv\text{-}h}$ from 0 to $2\pi$ and sweeping $\theta_{iCHB\text{-}h}$ from 0 to $2\pi$ in (16), the results of $a_{vac\text{-}CHB\text{-}3}$ and $b_{vac\text{-}CHB\text{-}3}$ for the $3^{rd}$ order harmonic are shown as both blue and green regions in FIG. 8. If the $r_h$ defined in equation (14) is larger than zero, for any $V_{ac\text{-}CHB\text{-}h} = a_{V_{ac\text{-}CHB\text{-}h}} + jb_{V_{ac\text{-}CHB\text{-}h}}$ which can meet the condition (17), it can meet the current harmonic limit regardless of its phase. The green safe circle regions on FIG. 7 (b) represent these solutions.

$$\sqrt{|a_{V_{ac\text{-}CHB\text{-}h}}|^2 + |b_{V_{ac\text{-}CHB\text{-}h}}|^2} \leq r_h = |\omega h L_T C_h I_L| - |V_{ac\text{-}Grid\text{-}h}| \quad (17)$$

As shown in FIGS. 4(a) and 8(a), when the inductance is small (between 0.04896 and 0.2448 p.u.), the CHB must control both the magnitude and phase of $V_{ac\text{-}CHB\text{-}h}$ so it can be located in the blue rings to meet the current harmonic limits defined in IEEE-519. As discussed previously, with small inductance, because the SHE-PWM can only generate zero voltage harmonics, the voltage $V_{ac\text{-}CHB\text{-}h}$ is at the origin inside the blank circle region in FIG. 8 (a). As a result, with small inductance, SHE-PWM cannot meet the limits of IEEE-519. Since SHM-PWM and SHCM-PWM do not control the phase of $V_{ac\text{-}CHB\text{-}h}$, they cannot control $V_{ac\text{-}CHB\text{-}h}$ to meet the limits either. In FIG. 8 (b), both the blue ring and green safe circle regions are solutions to IEEE-519. As discussed previously in FIG. 5(b), the green safe circle region at the origin of the coordinate is the limit that $V_{ac\text{-}CHB\text{-}h}$ can meet regardless of its phase. By using enough inductance $L_T$ in FIG. 5(b) or FIG. 8(b), $r_h$ will be larger than zero and harmonic limits can be met as long as condition (17) is met. Therefore, a higher number of harmonics can be mitigated with the SHCM-PWM techniques of the subject invention than with SHM-PWM or SHE-PWM as discussed previously.

As discussed above, inductance $L_T$ should be large enough to achieve high order harmonic compensation. For the inductance design in SHE-PWM, SHM-PWM and SHCM-PWM, two requirements must be considered. First, the inductance must be big enough to keep $r_h>0$, so that SHE-PWM, SHM-PWM and SHCM-PWM can meet the low order harmonic limits. In the green safe circle region in FIG. 8(b), without increasing the switching frequency of the rectifier, SHCM-PWM techniques of the subject invention can meet higher order harmonic limits without controlling the phase better than SHE-PWM and SHM-PWM. Second, the inductance must be large enough to attenuate the high order current harmonics, which cannot be eliminated or mitigated with SHE-PWM, SHM-PWM and SHCM-PWM to meet the limits. Two inductance designs based on the two requirements above will now be discussed as well as inductance design techniques for SHCM-PWM embodiments of the subject invention.

Figure 9:
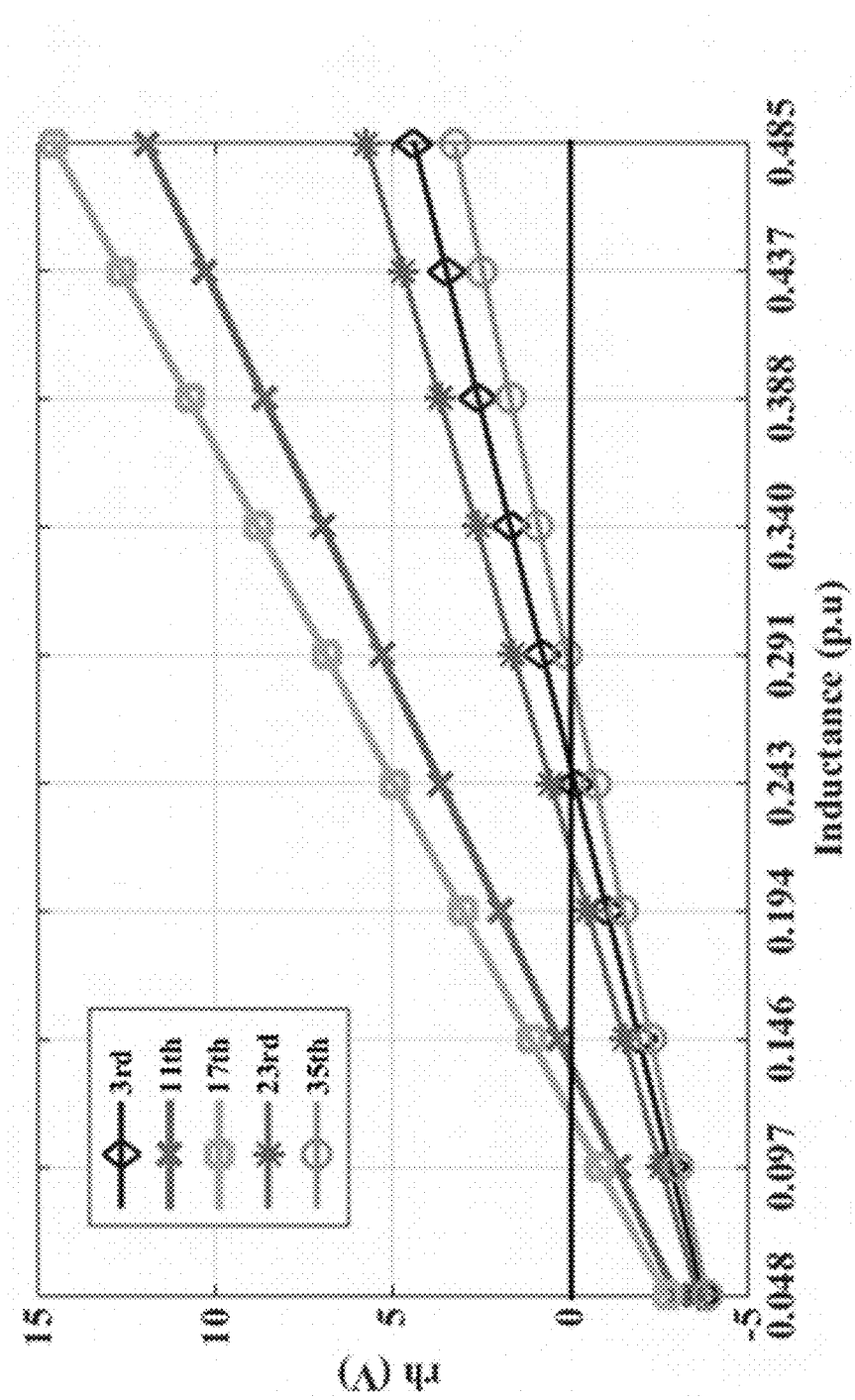
FIG. 9 is a graph showing $r_h$ as a function of $L_T$ and harmonic orders $3^{rd}$, $11^{th}$, $17^{th}$, $23^{rd}$, and $35^{th}$.

As discussed previously, IEEE 519 defines the $C_h$ for different current harmonic orders. For a given $L_T$, the radius $r_h$ of the solid red safe circle in FIG. 6 and the green safe circle regions in FIG. 8(b) can be calculated using equation (14). Because for the system under investigation the ratio of the short circuit current to the maximum load current is below 20, based on IEEE-519, $C_h$ is 4% from 3rd to $9^{th}$, 2% from $11^{th}$ to $15^{th}$, 1.5% from $17^{th}$ to 21st, 0.6% from $23^{rd}$ to $33^{rd}$ and 0.3% above $35^{th}$ order harmonics. Based on equation (14), if $V_{ac\text{-}Grid\text{-}h}$ is a constant equal to the voltage harmonic limit defined in IEEE-519, the $r_h$ as a function of inductance $L_T$ and harmonic order h can be drawn in FIG. 9. In FIG. 9, the inductance is from 1 mH (0.0485 p.u.) to 10 mH (0.485 p.u.). The curves of $3^{rd}$, $11^{th}$, $17^{th}$ and $35^{th}$ order harmonics are investigated in FIG. 8 because they are the lowest harmonic orders of each $C_h$ and based on equation (14) they have the smallest $r_h$ for each $C_h$ as $V_{ac\text{-}Grid\text{-}h}$ is constant.

In FIG. 9, the $r_h$ of the $35^{th}$ order harmonic has the strictest requirements as it is the smallest of all harmonics with the same $L_T$. Because $r_h$ has to be larger than zero, the smallest inductance that should be used for SHCM-PWM can be calculated as, $$|35\omega L_T C_{35} I_L| - |V_{ac\text{-}Grid\text{-}35}| \geq 0 \quad (18)$$

$$L_T \geq \frac{|V_{ac\text{-}Grid\text{-}35}|}{|35\omega C_{35} I_L|} \quad (19)$$

From equation (19) and FIG. 9, the smallest inductance used for the proposed SHCM-PWM is 5.8 mH or 0.281 p.u. It should be noted that the power line inductance is around 0.0485 p.u., which is much smaller than 0.281 p.u. Therefore, it will be assumed that $L_F \approx L_T$.

The inductance should also be designed to attenuate the high order harmonics that are not mitigated using the SHE-PWM, SHM-PWM and SHCM-PWM. From equation (3), because $b_h=0$, the output voltage harmonics of the CHB rectifier can be written as, $$|V_{ac\text{-}CHB\text{-}h}| = \frac{4V_{dc}}{\pi h}|\cos(h\theta_1) - \cos(h\theta_2) + \ldots + \cos(h\theta_K)| \quad (20)$$

Because $\cos|x| \leq 1$, $V_{ac\text{-}CHB\text{-}h}$ meets the condition in (21), $$|V_{ac\text{-}CHB\text{-}h}| = \frac{4V_{dc}}{\pi h}|\cos(h\theta_1) - \cos(h\theta_2) + \ldots + \cos(h\theta_K)| \leq \frac{4V_{dc}K}{\pi h} \quad (21)$$

Figure 6:
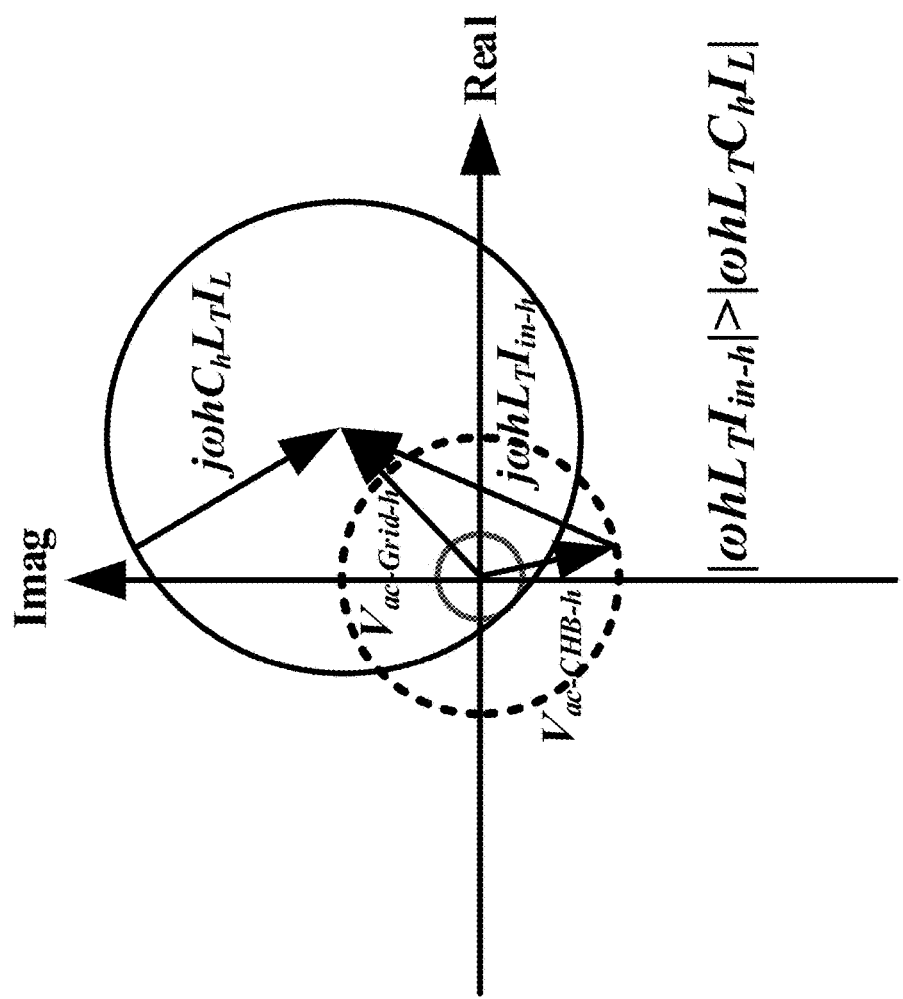
FIG. 6 shows the phasor diagram of $V_{ac\text{-}Grid\text{-}h}$+$j\omega hL_T I_{in\text{-}h}$ when the SHM-PWM technique is used with a big $L_T$.

In FIG. 6, when $V_{ac\text{-}CHB\text{-}h}$ reaches the maximum and is out of phase of $V_{ac\text{-}Grid\text{-}h}$, the harmonic currents have the maximum voltage drops on the inductor. Under such conditions, the harmonic current $L_{in\text{-}h}$ should still meet the current harmonic limit $C_h I_L$. This is represented by equation (22). The minimum inductance $L_T'$, which can always meet current harmonic limits for any high order harmonics that are not mitigated using SHE-PWM, SHM-PWM and SHCM-PWM, can therefore be derived from equation (23).

$$\frac{|V_{ac-CHB-h}|_{max} + |V_{ac-Grid-h}|}{\omega h L_T'} = |I_{in-h}|_{max} \leq C_h I_L \quad (22)$$

$$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L} \quad (23)$$

In equation (23), $L_T'$ decreases when h increases. Based on equation (23), because SHCM-PWM can mitigate higher orders of harmonics than SHE-PWM and SHM-PWM, $L_T'$ in equation (23) can be significantly reduced. Because the output fundamental voltage of the CHB with SHCM-PWM can be higher than grid voltage to achieve compensation, based on (3) the DC link voltage of each CHB cell can be designed based on equation (24).

$$\frac{4V_{dc} \times i}{\pi} > \text{Max}(V_{ac-Grid-1}) \quad (24)$$

Because both low and high order current harmonics of the CHB active rectifier should meet the limits, the desired inductance $L_T$ should be greater than the largest of equations (19) and (23). In addition, the inductance design should also meet the total demand distortion (TDD) limit. Because of this, the objective function set in equation (25), including the equation for modulation index $M_a$, should meet current harmonic limits and the total demand distortion (TDD) limit in IEEE 519, which is used to find switching angle solutions $\theta_1 \ldots \theta_k$ in SHCM-PWM for all harmonics below h.

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases} \quad (25)$$

Figure 10:
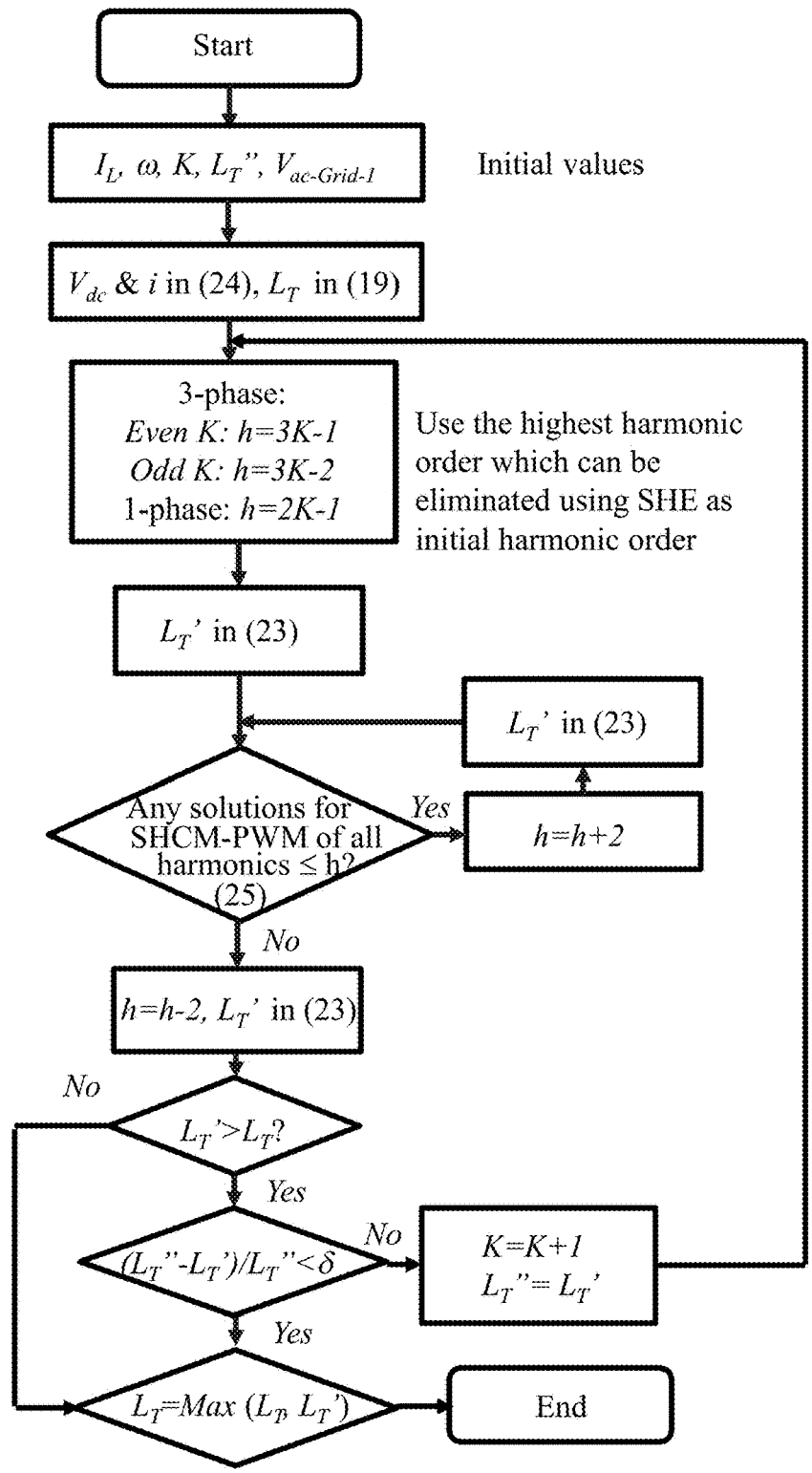
FIG. 10 shows a flowchart of an SHCM-PWM method according to an embodiment of the subject invention.

FIG. 10 illustrates a method according to an embodiment of the subject invention and includes a flowchart used to find the switching transition K that leads to the smallest inductance $L_T$ and the highest harmonic order that can be mitigated with this inductance. In FIG. 10, initial values for the maximum load current $I_L$, grid frequency $\omega$, switching transitions K, initial inductance $L_T''$ and grid voltage $V_{ac-Grid-1}$ are first assigned. $L_T''$ is a large inductance to start with. DC-link voltage $V_{dc}$ and the number i of cells can be determined from equation (24). $L_T$ is determined from equation (19). Because SHCM-PWM can mitigate higher order harmonics than SHE-PWM and SHM-PWM, the highest order harmonics that can be eliminated with SHE-PWM is assigned as the initial h. The initial $L_T'$, which is needed to meet the second requirement, is calculated from equation (23). With the given K, h will continuously increase and $L_T'$ will be updated (reduced) based on new h as long as SHCM-PWM has solutions for all harmonics below h. The highest h obtained will be used to calculate the final $L_T'$ of this iteration using equation (23) for the given K. The $L_T'$ will be compared with the $L_T$ determined by equation (19). If $L_T'$ is smaller than $L_T$, the final $L_T$ will be the $L_T$ determined by equation (19). Otherwise, $L_T'$ will be compared with $L_T''$ which is the $L_T'$ in the last iteration. If the ratio of the difference between $L_T''$ and $L_T'$ to $L_T''$ is greater than a predefined threshold δ (for example 5%), K will be increased for another iteration to get a smaller $L_T'$ and solutions for equation (25) until $L_T'$ is close to the minimum value (δ determines how close it is) or smaller than the $L_T$ determined by equation (19). The larger of $L_T$ and $L_T'$ will be selected as the final $L_T$. By following FIG. 10, K and $L_T$ can meet the requirements of equations (19), (23), and (25). The switching transitions K (switching frequency=Kω/(2iπ)) and the smallest $L_T$ can be determined. The highest harmonic order h, which can be mitigated with SHCM-PWM to be below the limit, is identified. With this K and $L_T$, SHCM-PWM according to the subject invention can mitigate the harmonics to be below the limits up to order h. $L_T$ can attenuate the harmonics higher than h to below the limits. Furthermore, harmonics can meet the TDD limit. To solve equation (25) in FIG. 9, multi-objective particle swarm optimization techniques can be applied. Following the flowchart, the parameters came out as K=9; h=69$^{th}$, i=3, $L_F$=10 mH (0.485 p.u.) for the specs given in Table I.

A more detailed explanation, including some benefits, of methods of the subject invention will now be given. There are three basic objectives for the designed flowchart in FIG. 10: (a) to find the smallest coupling inductance for the grid-tied CHB converter to reduce cost and volume of the converter; (b) to find the lowest number of switching transitions for SHCM-PWM techniques of the subject invention, because lower switching frequency can increase converter efficiency; and (c) to find the number of harmonics that need to be controlled by the SHCM-PWM techniques of the subject invention.

Referencing FIG. 10, the first step determines parameters including RMS grid voltage ($V_{ac-Grid-1}$), converter maximum demand load current ($I_L$), and grid voltage frequency (ω) that should be known at the first step. Also, initial values for converter switching transitions in each quarter period (K) and converter inductance ($L_T''$) can also be selected. Second, with initial parameters $V_{ac-Grid-1}$ and $I_L$ from the first step, the dc link voltage of each cell ($V_{dc}$) and the number of CHB converter cells (i) can be selected from equation (24). Also, the required inductance based on equation (19) ($L_T$) can be designed in second step.

In step 3, the number of harmonics that can be eliminated with SHE-PWM can be obtained based on the number of converter switching transitions in each quarter period (K). Then, the SHE-PWM equations can be used by SHCM-PWM (of the subject invention) to obtain an initial number harmonics that need to be controlled in the 3$^{rd}$ step. In step four, having initial values for K, $V_{ac-Grid-1}$, $I_L$, $V_{dc}$, ω, and h, the required inductance can be obtained based on equation (23) ($L_T'$). In designing the inductance of SHCM-PWM (of the subject invention), both conditions (19) and (23) should be met. In other words, the designed inductance must greater than or equal to $L_T$ and $L_T'$ in (19) and (23), respectively. Because $L_T$ in (19) is independent of K and h, which are critical parameters to inductance design, the $L_T$ gives us the minimum inductance that can be chosen with the SHCM-PWM techniques of the subject invention. However, the $L_T'$ in (23) depends on both K and h. Therefore, its value can be higher or lower than $L_T$ in (19) and this value decides the required inductance of the CHB converter.

In the fifth step, based on $L_T'$ and all the other parameters in previous steps, the equation set (25) is solved to find solutions of SHCM-PWM of the present invention. If there are solutions for the SHCM-PWM with highest number of controlled harmonics h, then the h can be increased h=h+2. With the new h, the $L_T'$ in equation (23) is obtained to solve equation set (25) again with the new parameters.

In the sixth step, if there are no solutions for equation set (25) of SHCM-PWM with the highest number of harmonics h that must be controlled, then the h is reduced to h=h−2 and $L_T'$ will be recalculated based on equation (23). In the seventh step, the obtained inductance $L_T'$ in step 6 can be compared with $L_T$ in (19). If the $L_T'$ becomes lower than $L_T$ in equation (19), then the designed converter inductance of converter is $L_T$ to meet both conditions of equations (19) and (23). Also, all of the required parameters are obtained, such as switching transitions of SHCM-PWM (K) and maximum number of harmonics that should be met (h).

In step eight, if the $L_T'$ is higher than $L_T$, then it is determine whether the value of $$\frac{L_T'' - L_T'}{L_T''}$$

is higher or lower than a predefined threshold δ (for example 5%). If the value of $$\frac{L_T'' - L_T'}{L_T''}$$

is lower than δ, then the designed inductance is $L_T'$, because it can meet both equations (19) and (23). As a result, other parameters also are also determined. In step 9, if $$\frac{L_T'' - L_T'}{L_T''}$$

is higher than δ, then the switching transitions K increase to K+1 and the $L_T''$ becomes $L_T'$ for the next iteration which begins again from the $3^{rd}$ step.

Figure 11:
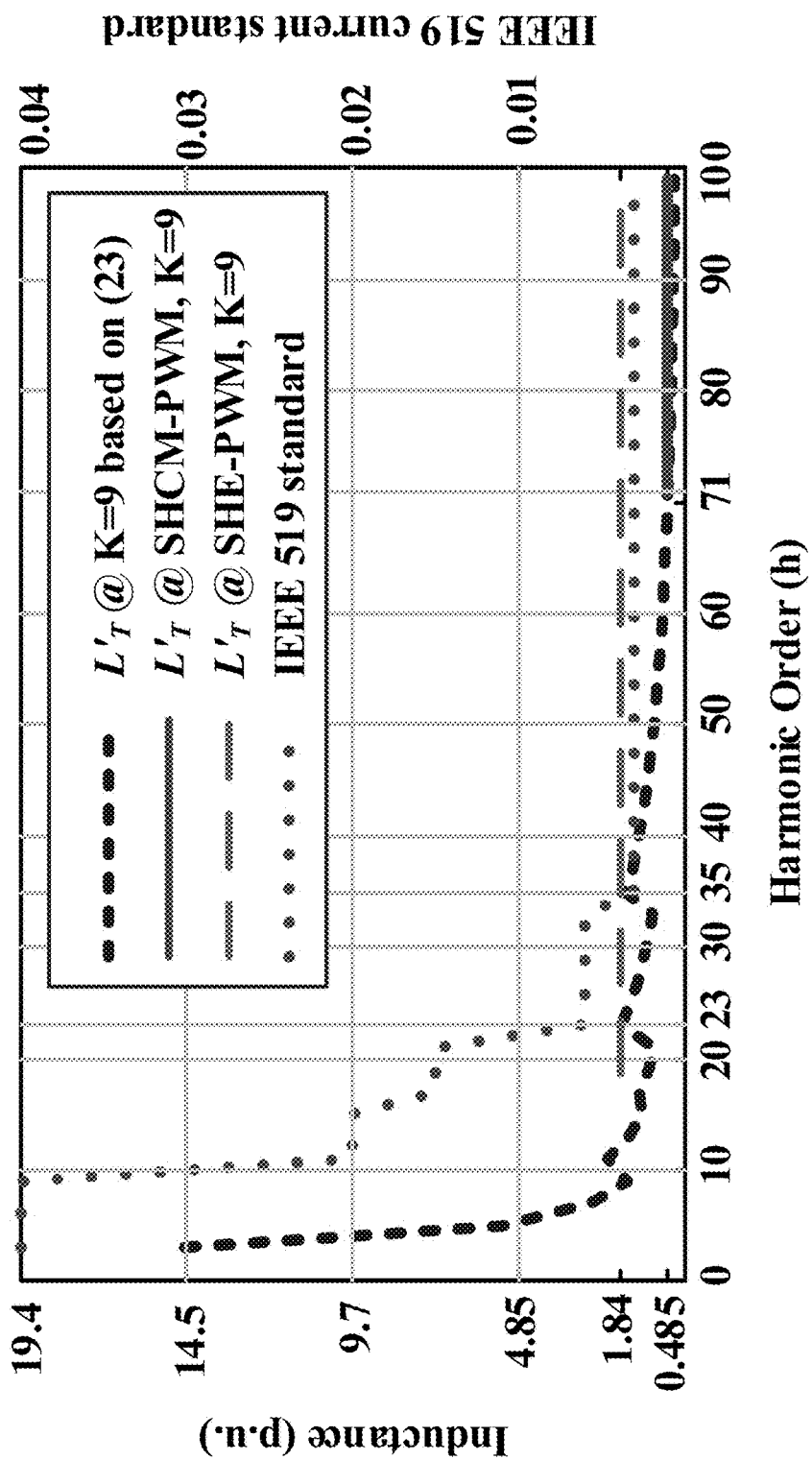
FIG. 11 shows required inductance to meet high order harmonics that cannot be reduced by modulation techniques.

In order to compare the proposed SHCM-PWM techniques of the subject invention using the SHE-PWM and SHM-PWM techniques with the same number of switching transitions for both single phase and three phase CHB active rectifiers, the required inductance $L_T \approx L_F$ that can meet the high order harmonic requirement in equation (23) is shown in FIG. 11 from the 3rd to 100th harmonic orders. With the SHE-PWM technique, when K=9, the highest harmonic order that can be eliminated is $17^{th}$ in the single-phase and $25^{th}$ in three-phase systems. As shown in FIG. 11, in order to guarantee that all of the harmonics higher than the $17^{th}$ for a single phase or the $25^{th}$ for a three phase system can meet IEEE-519, the smallest inductance that should be used with SHE-PWM is 38 mH (1.84 p.u.) in single-phase or 34 mH (1.65 p.u) in three-phase systems. In the single phase CHB with the SHM-PWM technique, the highest harmonics that can be mitigated to meet the requirements of IEEE 519 with K=9 is the $23^{rd}$. A 34 mH (1.65 p.u.) inductance should be used for single-phase SHM-PWM techniques. On the other hand, it will be shown that the SHCM-PWM techniques of the subject invention can meet IEEE-519 up to the $69^{th}$ order, and the smallest inductance that can meet IEEE-519 for high order harmonics in both single and three phase systems is around 10 mH (0.485 p.u.) with K=9. The circuit parameters, which are used in both simulations and experiments, are shown in Table II. Other parameters are given by Table I.

TABLE II

SIMULATION AND EXPERIMENTAL PARAMETERS FOR A GRID CONNECTED CHB RECTIFIER

| Parameter | Symbol | Value |
| --- | --- | --- |
| Number of H-bridge cells | i | 3 |
| DC bus voltage | $V_{dc}$ | 70 V |
| Input inductance | $L_F$ | 10 mH (0.485 p.u.) |

Figure 12:
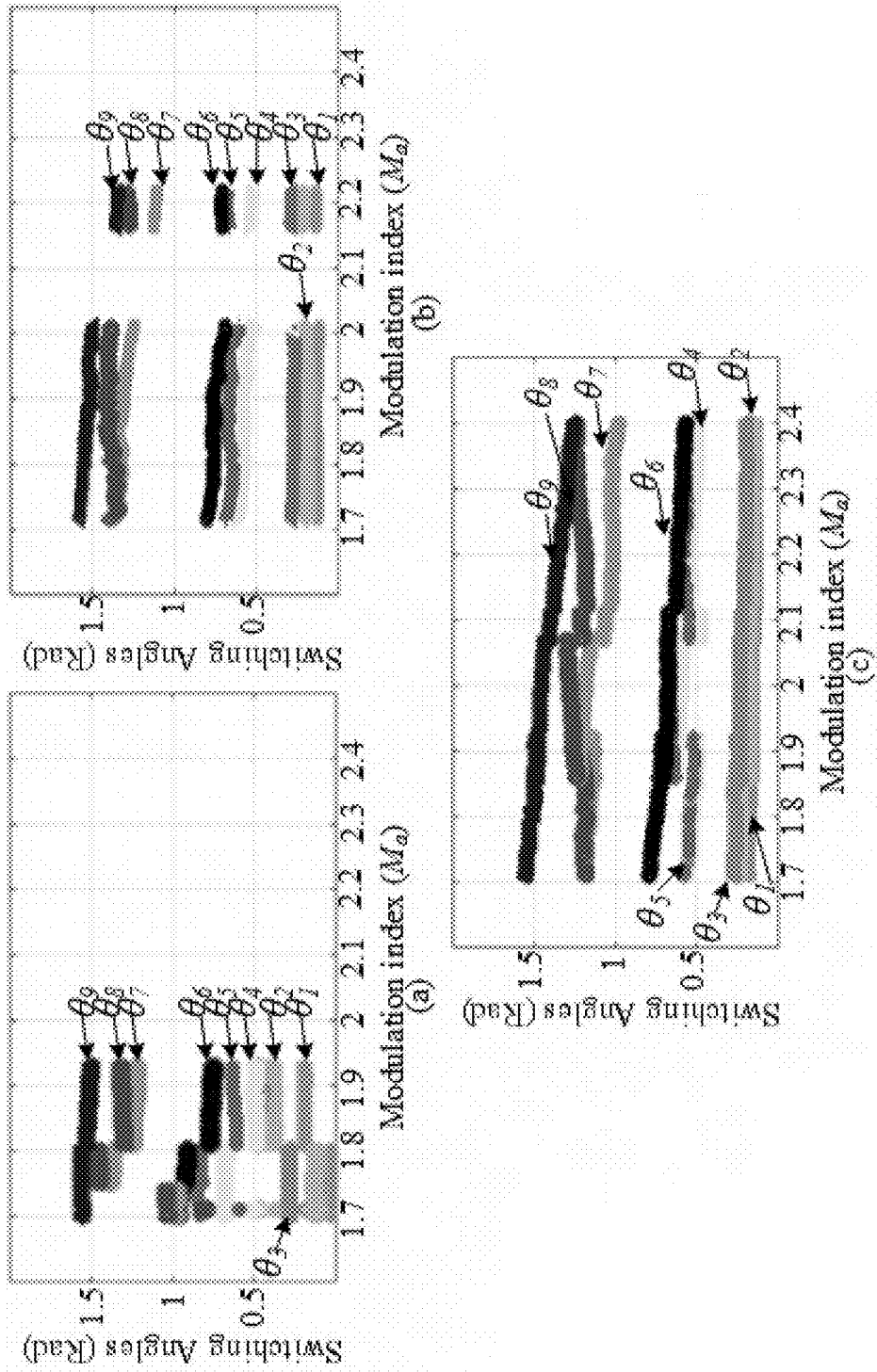
FIG. 12 shows solutions of the optimization techniques: (a) SHE-PWM, (b) SHM-PWM, and (c) SHCM-PWM according to an embodiment of the subject invention.

The final switching angle solutions for embodiments of the subject invention can be obtained by following the flowchart in FIG. 10 and are shown in FIG. 12(c). The switching angle solutions for SHE-PWM and SHM-PWM are shown in FIGS. 12(a) and (b). Because techniques for finding the solutions for SHE-PWM and SHM-PWM are well known, they are not discussed herein. As shown in FIGS. 12(a) and (b), the solution ranges of SHE-PWM and SHM-PWM techniques are much lower than the SHCM-PWM techniques of the subject invention. The comparison of the required inductance to meet both harmonic and TDD limits for SHE-PWM, SHM-PWM and SHCM-PWM techniques of the subject invention can be seen in Table III. As Table III demonstrates, with the same switching frequency of 180 Hz for each cell, SHCM-PWM techniques of the subject invention need the least inductance.

TABLE III

COMPARISON OF MODULATION TECHNIQUES

| Modulation technique | Switching frequency | Number of harmonics that can be controlled | Required Inductance (p.u.) to meet current harmonic limits |
| --- | --- | --- | --- |
| SHE-PWM | 180 Hz | $17^{th}$ | 1.16 p.u. (24 mH) |
| SHM-PWM | 180 Hz | $23^{rd}$ | 0.728 p.u. (15 mH) |
| SHCM-PWM | 180 Hz | $69^{th}$ | 0.485 p.u. (10 mH) |

The subject invention includes, but is not limited to, the following exemplified embodiments.

Embodiment 1

A method of selective harmonic current mitigation pulse width modulation (SHCM-PWM) (including finding the smallest coupling inductance for a grid-tied CHB converter, finding the lowest number of switching transitions, and determining the number of harmonics that need to be controlled), the method comprising:

determining parameters including RMS grid voltage ($V_{ac\text{-}Grid\text{-}1}$), converter maximum demand load current ($I_L$), and grid voltage frequency (ω), initial values for converter switching transitions in each quarter period (K), and converter inductance ($L_T''$);

determining the dc link voltage of each cell ($V_{dc}$) and the number of CHB converter cells (i) using the $V_{ac\text{-}Grid\text{-}1}$ and $I_L$ and equation $$\frac{4V_{dc} \times i}{\pi} > \text{Max}(V_{ac-Grid-1});$$

determining the required inductance based on equation (19) ($L_T$) from $$L_T \geq \frac{|V_{ac-Grid-35}|}{|35\omega C_{35} I_L|};$$

determining the number of harmonics that can be eliminated using the number of converter switching transitions in each quarter period (K);

using SHE-PWM equations to obtain an initial number harmonics that need to be controlled (in SHCM-PWM);

having values for K, $V_{ac-Grid-1}$, $I_L$, $V_{ac}$, $\omega$, and h, obtaining the required inductance ($L_T'$) using equation $$L_T' \geq \frac{|V_{ac-CHB-h}|_{max} + |V_{ac-Grid-h}|}{\omega h C_h I_L} = \frac{4 V_{dc} K}{\omega h^2 C_h I_L \pi} + \frac{|V_{ac-Grid-h}|}{\omega h C_h I_L};$$

ensuring that the designed inductance is greater than or equal to $L_T$ and $L_T'$ in both of equation $$L_T \geq \frac{|V_{ac-Grid-35}|}{|35\omega C_{35} I_L|}$$

and equation $$L_T' \geq \frac{|V_{ac-CHB-h}|_{max} + |V_{ac-Grid-h}|}{\omega h C_h I_L} = \frac{4 V_{dc} K}{\omega h^2 C_h I_L \pi} + \frac{|V_{ac-Grid-h}|}{\omega h C_h I_L};$$

determining the minimum inductance using equation (19)

$$L_T \geq \frac{|V_{ac-Grid-35}|}{|35\omega C_{35} I_L|};$$

determining the required inductance ($L_T'$, i.e., the required inductance of the CHB converter) using K, h, and equation $$L_T' \geq \frac{|V_{ac-CHB-h}|_{max} + |V_{ac-Grid-h}|}{\omega h C_h I_L} = \frac{4 V_{dc} K}{\omega h^2 C_h I_L \pi} + \frac{|V_{ac-Grid-h}|}{\omega h C_h I_L};$$

using $L_T'$ and the other parameters, determine the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases};$$

wherein, if there are solutions for the SHCM-PWM with a highest number of controlled harmonics h, then increase h by 2 (h=h+2) and, with the new h, determine a new $L_T'$ using equation (23)

$$L_T' \geq \frac{|V_{ac-CHB-h}|_{max} + |V_{ac-Grid-h}|}{\omega h C_h I_L} = \frac{4 V_{dc} K}{\omega h^2 C_h I_L \pi} + \frac{|V_{ac-Grid-h}|}{\omega h C_h I_L}$$

and solve equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;

comparing the obtained inductance $L_T'$ with $L_T$ in equation (19) and determining if the $L_T'$ is lower than $L_T$ in equation (19) [this ensures that the inductance of designed converter $L_T$ to meet both conditions of equations (19) and (23)]; and obtaining all of the required parameters including switching transitions of SHCM-PWM (K) and the maximum number of harmonics that should be met (h).

Embodiment 2

The method of Embodiment 1, wherein $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

is solved using multi-objective particle swarm optimization.

Embodiment 3

The method of any of Embodiments 1 to 2, wherein the method is applied to a cascaded H-bridge multilevel active rectifier.

Embodiment 4

The method of any of Embodiments 1 to 3, wherein the method is applied to a cascaded H-bridge multilevel active rectifier.

Embodiment 5

The method of any of Embodiments 1 to 4, wherein, if there are no solutions for equation set (25) of SHCM-PWM with the highest number of harmonics h that must be controlled, then reduce h by two (h=h−2) and recalculate $L_T'$ using equation (23).

Embodiment 6

The method of any of Embodiments 1 to 5, further comprising comparing the obtained inductance $L_T'$ with $L_T$ in (19) and determining if the $L_T'$ is lower than $L_T$ in equation (19) [this ensures that the inductance of designed converter $L_T$ to meets both conditions of equations (19) and (23)].

Embodiment 7

The method of any of Embodiments 1 to 6, wherein if the $L_T'$ is higher than $L_T$, determining whether the value of $$\frac{L_T'' - L_T'}{L_T''}$$

is higher or lower than a predefined threshold δ (e.g., example 5%) and, if the value of $$\frac{L_T'' - L_T'}{L_T''}$$

is lower than δ, determining the inductance $L_T'$ (and the other parameters).

Embodiment 8

The method of any of Embodiments 1 to 7, wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K); and using SHE-PWM equations to obtain an initial number harmonics that need to be controlled (in SHCM-PWM).

Embodiment 9

A method of selective harmonic current mitigation pulse width modulation (SHCM-PWM) (including finding the smallest coupling inductance for a grid-tied CHB converter, finding the lowest number of switching transitions, and determining the number of harmonics that need to be controlled), the method comprising:

determining parameters including RMS grid voltage ($V_{ac-Grid-1}$), converter maximum demand load current ($I_L$), and grid voltage frequency (ω), initial values for converter switching transitions in each quarter period (K), and converter inductance ($L_T''$);

determining the dc link voltage of each cell ($V_{dc}$) and the number of CHB converter cells (1) using the $V_{ac-Grid-1}$ and $I_L$ and equation $$\frac{4V_{dc} \times i}{\pi} > \text{Max}(V_{ac-Grid-1});$$

determining the required inductance based on equation (19) ($L_T$) from $$L_T \geq \frac{|V_{ac-Grid-35}|}{|35\omega C_{35} I_L|};$$

determining the number of harmonics that can be eliminated using the number of converter switching transitions in each quarter period (K);

using SHE-PWM equations to obtain an initial number harmonics that need to be controlled (in SHCM-PWM);

having values for K, $V_{ac-Grid-1}$, $I_L$, $V_{dc}$, ω, and h, obtaining the required inductance ($L_T'$) using equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

ensuring that the designed inductance is greater than or equal to $L_T$ and $L_T'$ in both of equation $$L_T \geq \frac{|V_{ac-Grid-35}|}{|35\omega C_{35} I_L|};$$

and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

determining the minimum inductance using equation (19)

$$L_T \geq \frac{|V_{ac-Grid-35}|}{|35\omega C_{35} I_L|};$$

determining the required inductance ($L_T'$, i.e., the required inductance of the CHB converter) using K, h, and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

using $L_T'$ and the other parameters, determining the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases};$$

wherein, if there are solutions for the SHCM-PWM with a highest number of controlled harmonics h, then increase h by 2 (h=h+2) and, with the new h, determining a new $L_T'$ using equation (23)

$$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L}$$

and solving equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;

wherein, if there are no solutions for equation set (25) of SHCM-PWM with the highest number of harmonics h that must be controlled, reducing h by two (h=h−2) and recalculating $L_T'$ using equation (23);

comparing the obtained inductance $L_T'$ with $L_T$ in (19) and determining if the $L_T'$ is lower than $L_T$ in equation (19) [this ensures that the inductance of the designed converter $L_T$ meets both conditions in equations (19) and (23)];

obtaining all of the required parameters including switching transitions of SHCM-PWM (K) and the maximum number of harmonics that should be met (h);

wherein, if the $L_T'$ is greater than $L_T$, the method further comprises determining whether the value of $$\frac{L_T'' - L_T'}{L_T''}$$

is higher or lower than a predefined threshold δ (e.g., example 5%) and, if the value of $$\frac{L_T'' - L_T'}{L_T''}$$

is lower than δ, determining the designed inductance as $L_T'$ (and the other parameters can be determined); and wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K), and using SHE-PWM equations to again obtain the number harmonics that need to be controlled (in SHCM-PWM).

Embodiment 10

A method of selective harmonic current mitigation pulse width modulation (SHCM-PWM), the method comprising:

determining parameters including RMS grid voltage ($V_{ac\text{-}Grid\text{-}1}$), converter maximum demand load current ($I_L$), and grid voltage frequency (ω), initial values for converter switching transitions in each quarter period (K), and converter inductance ($L_T''$);

determining the dc link voltage of each cell ($V_{dc}$) and the number of CHB converter cells (i) using the $V_{ac\text{-}Grid\text{-}1}$ and $I_L$ and equation $$\frac{4V_{dc} \times i}{\pi} > \text{Max}(V_{ac\text{-}Grid\text{-}1});$$

determining the required inductance based on equation (19) ($L_T$) from $$L_T \geq \frac{|V_{ac\text{-}Grid\text{-}35}|}{|35\omega C_{35} I_L|};$$

determining the number of harmonics that can be eliminated using the number of converter switching transitions in each quarter period (K);

using SHE-PWM equations to obtain an initial number harmonics that need to be controlled;

having values for K, $V_{ac\text{-}Grid\text{-}1}$, $I_L$, $V_{ac}$, ω, and h, obtaining the required inductance ($L_T'$) using equation $$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L};$$

ensuring that the designed inductance is greater than or equal to $L_T$ and $L_T'$ in both of equation $$L_T \geq \frac{|V_{ac\text{-}Grid\text{-}35}|}{|35\omega C_{35} I_L|}$$

and equation $$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L};$$

determining the minimum inductance using equation (19)

$$L_T \geq \frac{|V_{ac\text{-}Grid\text{-}35}|}{|35\omega C_{35} I_L|};$$

determining the required inductance ($L_T'$) using K, h, and equation $$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L};$$

using $L_T'$ and the other parameters, determining the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac\text{-}Grid\text{-}h}| + |V_{ac\text{-}CHB\text{-}h}|}{|\omega h L_T I_L|} \leq C_h, h = 3, 5, 7, \ldots \end{cases};$$

wherein, if there are solutions for the SHCM-PWM with a highest number of controlled harmonics h, then increase h by 2 (h=h+2) and, with the new h, determine a new $L_T'$ using equation (23)

$$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L}$$

and solve equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;

comparing the obtained inductance $L_T'$ with $L_T$ in equation (19) and determining if the $L_T'$ is lower than $L_T$ in equation (19);

obtaining all of the required parameters including switching transitions of SHCM-PWM (K) and the maximum number of harmonics that should be met (h);

storing the all of the required parameters into a lookup table;

providing a control signal from the lookup table to a gate signal driver; and providing a gate signal from the gate signal driver to a cascaded H-bridge multilevel active rectifier.

Embodiment 11

The method of embodiment 10, the cascaded H-bridge multilevel active rectifier being connected a grid through an inductor.

Embodiment 12

The method of embodiment 11, the grid being at least one of a neutral point clamped (NPC) and a flying capacitor (FC).

Embodiment 13

The method of embodiment 10, the cascaded H-bridge multilevel active rectifier being connected to a motor.

Embodiment 14

The method of embodiment 13, the motor being at least one of a three-phase asynchronous motor and a single phase asynchronous motor.

Embodiment 15

The method of embodiment 10, the cascaded H-bridge multilevel active rectifier being connected to a filter.

Embodiment 16

The method of embodiment 15, the filter being at least one of an L filter, an LC filter, and an LCL filter.

Embodiment 17

The method of any of embodiments 10-16, wherein, if there are no solutions for equation set (25) of SHCM-PWM with the highest number of harmonics h that must be controlled, then reduce h by two (h=h−2) and recalculate $L_T'$ using equation (23).

Embodiment 18

The method of any of embodiments 10-17, further comprising comparing the obtained inductance $L_T'$ with $L_T$ in equation (19) and determining if the $L_T'$ is lower than $L_T$ in equation (19).

Embodiment 19

The method of embodiment 18, wherein if the $L_T'$ is higher than $L_T$, determining whether the value of $$\frac{L_T'' - L_T'}{L_T''}$$

is higher or lower than a predefined threshold δ and, if the value of $$\frac{L_T'' - L_T'}{L_T''}$$

is lower than δ, determining the inductance $L_T'$.

Embodiment 20

The method of embodiment 19, wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K); and using SHE-PWM equations to obtain an initial number harmonics that need to be controlled.

A greater understanding of the subject invention and of its many advantages may be had from the following example, given by way of illustration. The following example is illustrative of some of the methods, applications, embodiments, and variants of the subject invention. It is, of course, not to be considered as limiting the invention. Numerous changes and modifications can be made with respect to the invention.

Example 1—Experimental Simulations and Prototypes

Figure 13:
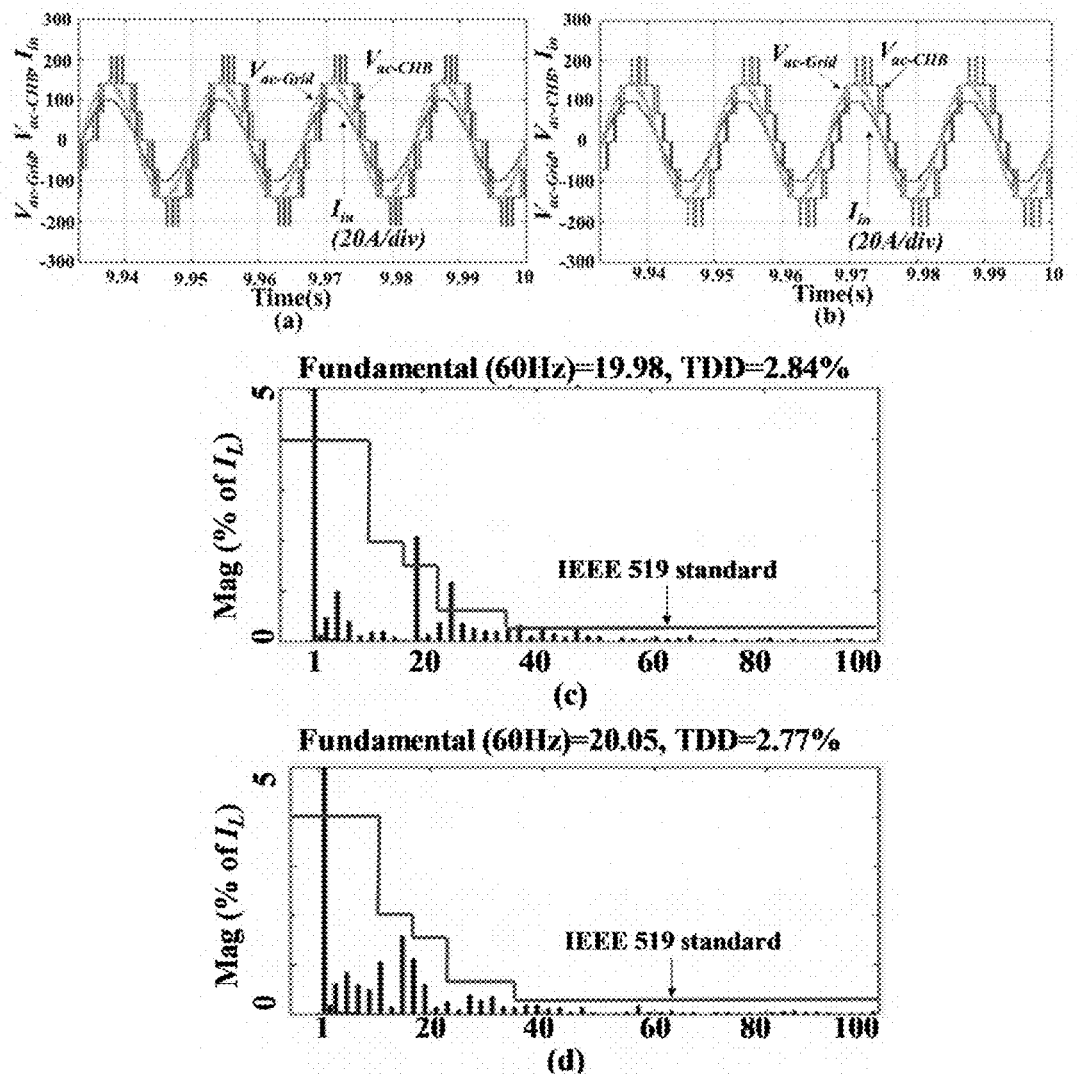
FIG. 13 shows simulation results of conventional SHE-PWM and SHCM-PWM with $M_a$=1.93, (a) time domain waveforms when SHE-PWM is applied, (b) time domain waveforms when SHCM-PWM is applied, (c) current harmonic distortion of SHE-PWM, and (d) current harmonic distortion of SHCM-PWM.
Figure 14:
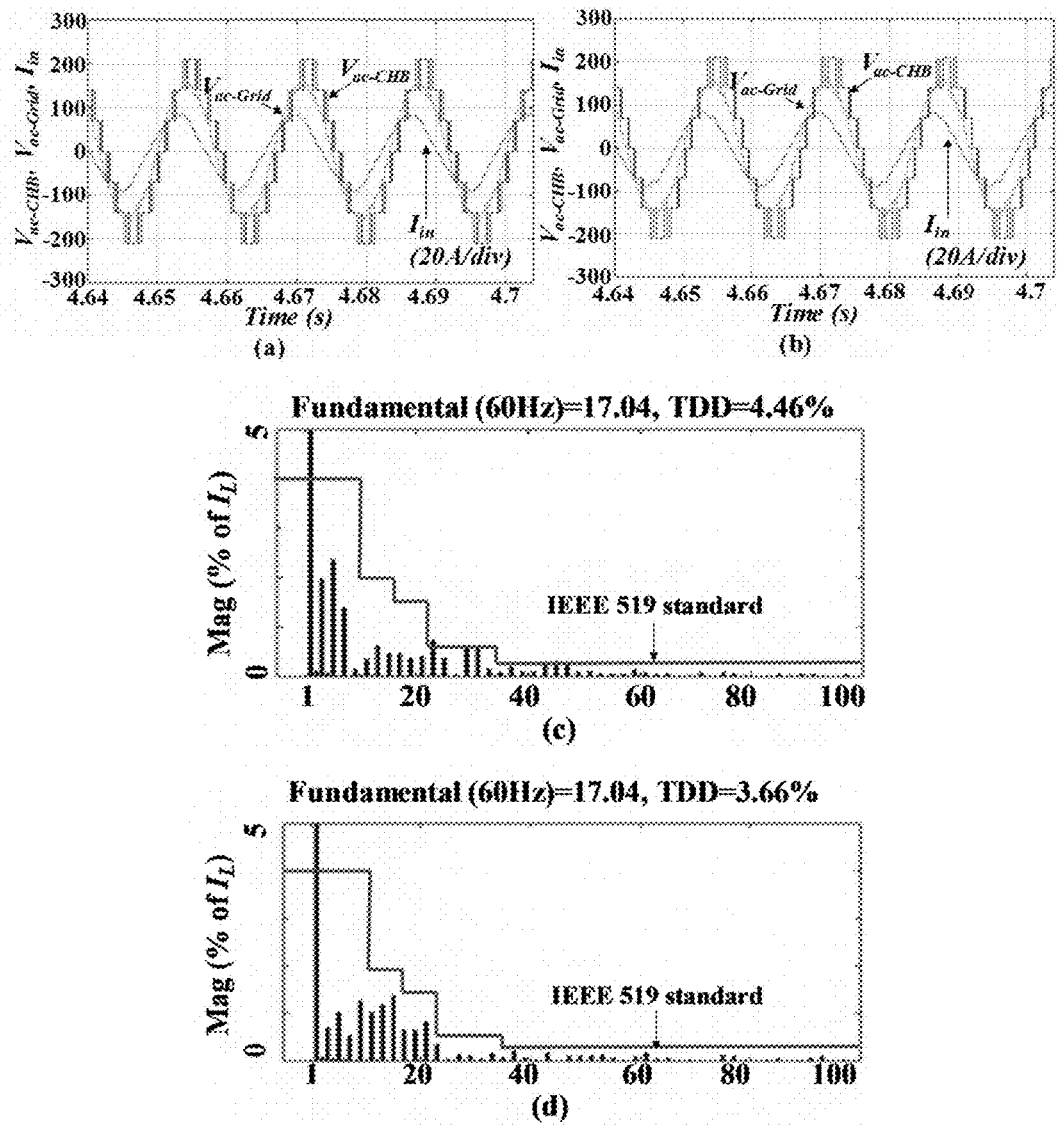
FIG. 14 shows simulation results of SHM-PWM and SHCM-PWM with $M_a$=2.16, (a) time domain waveforms when SHM-PWM is applied, (b) time domain waveforms when SHCM-PWM is applied, (c) current harmonic distortion of SHM-PWM, and (d) current harmonic distortion of SHCM-PWM.

A simulation was conducted in MATLAB Simulink to prove the concepts of the subject invention. The simulation circuit was as shown in FIG. 1, with i=3, k=9 and $n_1=n_2=n_3=3$. The DC/DC rectifiers were replaced with voltage source $V_{dc}$. The circuit parameters were the same as in Tables I and II. The proposed SHCM-PWM of the subject invention and the SHE-PWM and SHM-PWM were simulated. Two operating points were simulated: $M_a$=1.93 with unity power factor and $M_a$=2.16 with an 0.89 leading power factor. FIGS. 13(a) and (b) show the simulated $V_{ac-Grid}$, $V_{ac-CHB}$ and $I_{in}$ when the modulation index was equal to 1.93 with SHE-PWM and the SHCM-PWM of the subject invention, respectively. The grid voltage had voltage distortions as shown in FIGS. 13(a) and (b). FIGS. 13(c) and (d) show the simulated harmonic distortions with conventional SHE-PWM and with an SHCM-PWM embodiment of the subject invention, respectively. It is shown in FIGS. 13(c) and (d) that, because the switching angles are optimized for all of the harmonics up to $69^{th}$ order, the SHCM-PWM embodiments of the subject invention can meet both current harmonic and TDD limits of IEEE-519. On the other hand, based on the previous analysis, SHE-PWM can only eliminate harmonics up to the $17^{th}$, so although SHE-PWM may meet the TDD limit, the $19^{th}$, $25^{th}$, $37^{th}$, $41^{st}$ and $47^{th}$ harmonics do not meet these limits. FIGS. 14(a) and (b) show the simulated $V_{ac-Grid}$, $V_{ac-CHB}$ and $I_{in}$ with $M_a=2.16$ and an 0.89 leading power factor for SHM-PWM and SHCM-PWM of the subject invention, respectively. FIGS. 14(c) and (d) show the simulated harmonic distortion with SHM-PWM and SHCM-PWM according to the subject invention, respectively. For SHM-PWM, the $23^{rd}$, $29^{th}$, $31^{st}$, $43^{rd}$, and $45^{th}$ harmonics do not meet IEEE-519. On the other hand, SHCM-PWM of the subject invention can meet up to the 100th order harmonic limits. The TDD was 3.66% which meets the 5% TDD limit as well. It should be noted that grid harmonics are also extracted and included in the simulations. To simulate grid voltage distortions, a grid voltage waveform was first measured with an oscilloscope and its harmonic spectrum was extracted using fast Fourier transform (FFT) up to the 40th order, which is usually considered as the upper limit for THD calculations. The extracted grid voltage harmonics, which include both magnitudes and phases, were added to an ideal grid voltage in the simulations.

Figure 15:
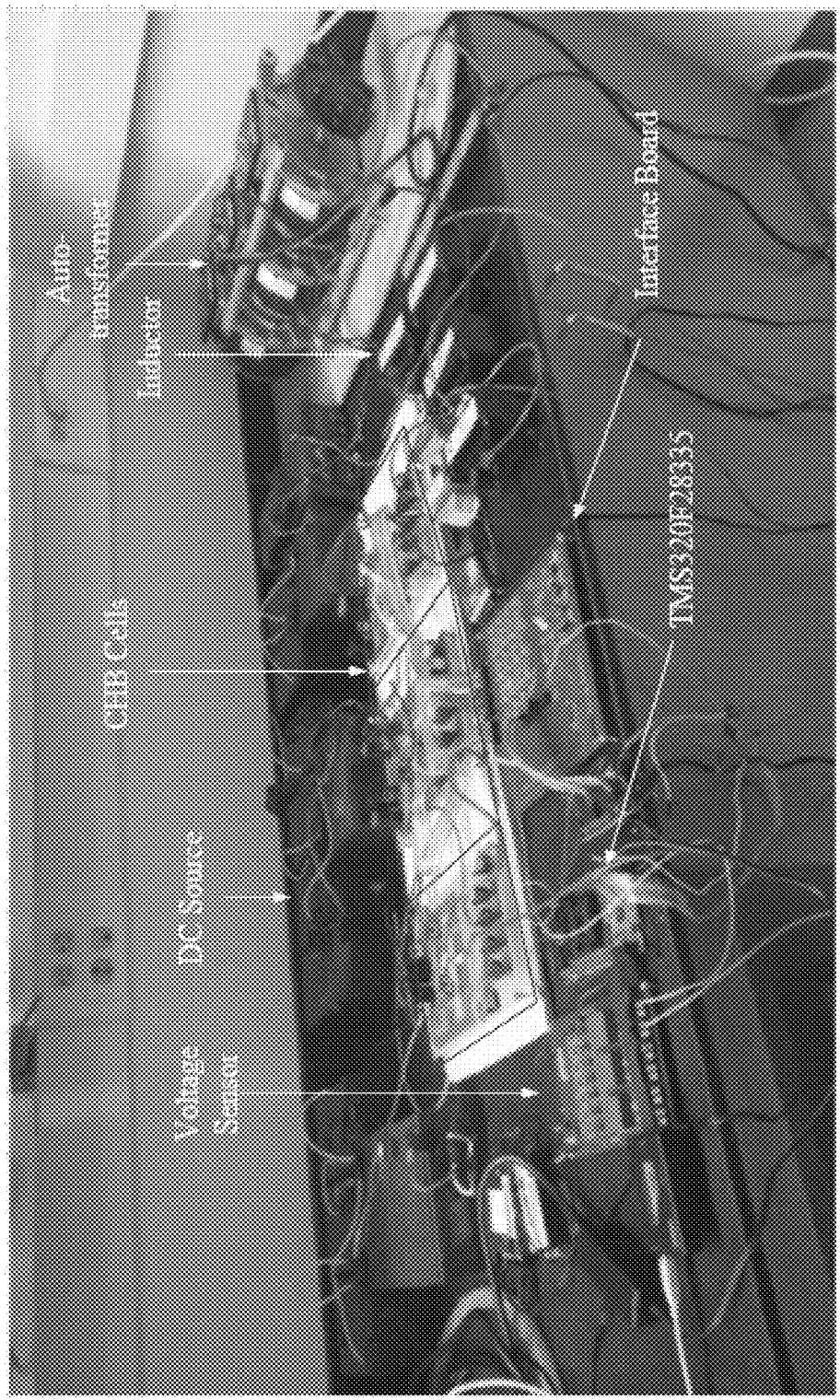
FIG. 15 is an image of a hardware prototype of a grid tied 7-level CHB converter.
Figure 16:
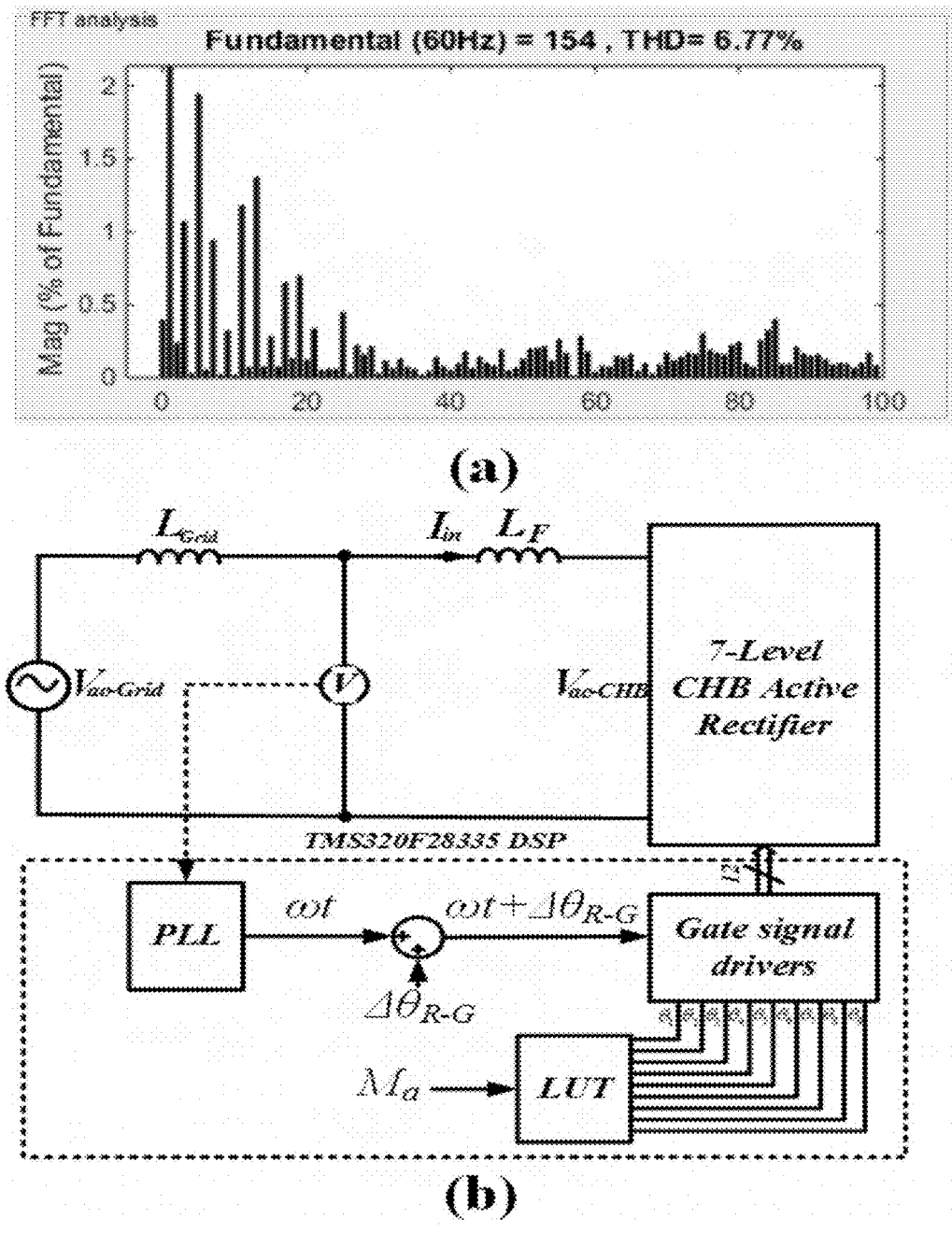
FIG. 16(a) shows a graph of actual grid voltage harmonics.
FIG. 16(b) shows a function block of hardware.
Figure 17:
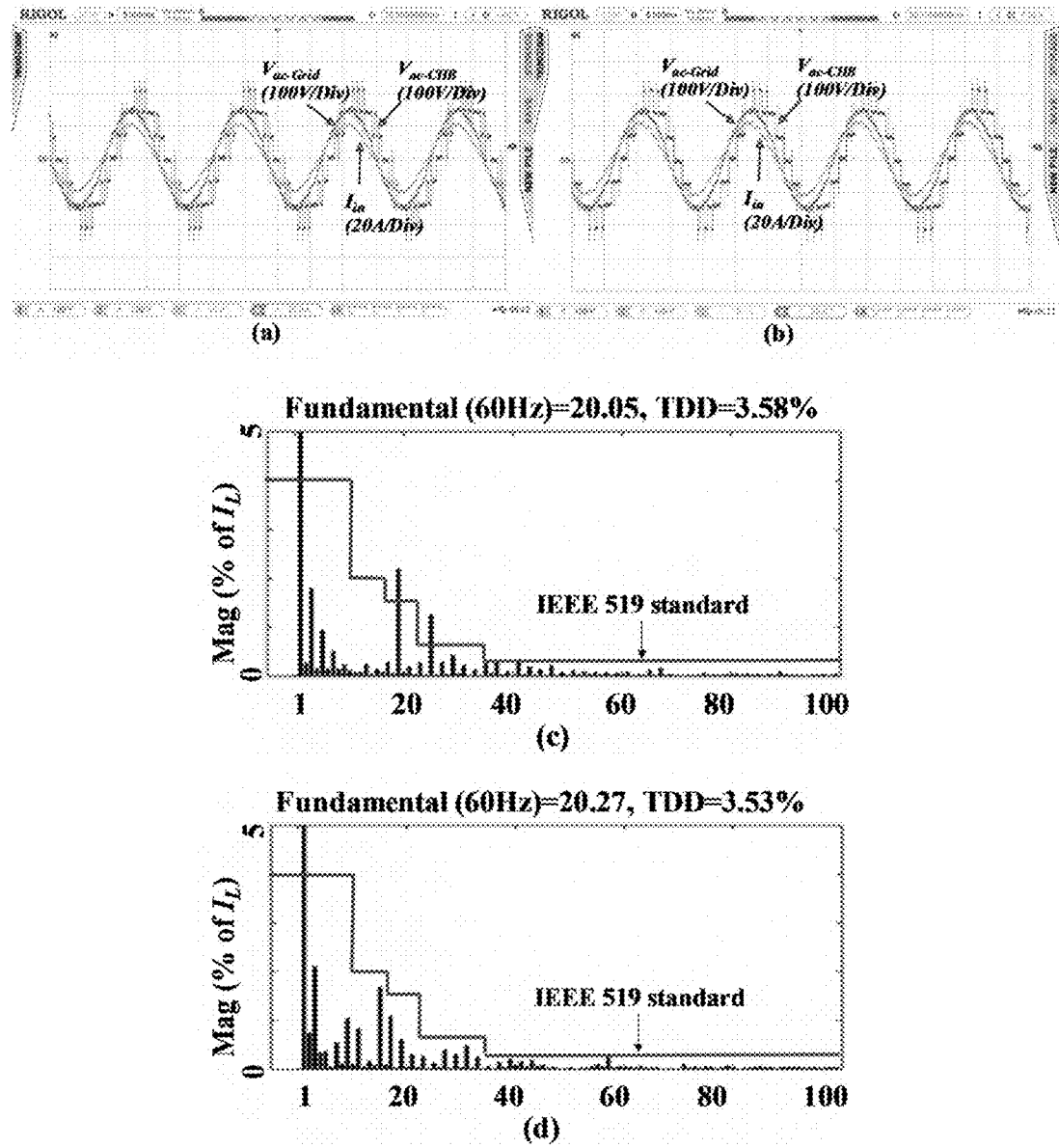
FIG. 17 shows experimental results for SHE-PWM and SHCM-PWM on a grid tied CHB rectifier when $M_a$=1.93: (a) $V_{ac\text{-}Grid}$, $V_{ac\text{-}CHB}$ and $I_{in}$ with SHE-PWM, (b) $V_{ac\text{-}Grid}$, $V_{ac\text{-}CHB}$, and $I_{in}$ with SHCM-PWM, (c) the harmonic spectrum of $I_{in}$ with SHE-PWM, and (d) the harmonic spectrum of $I_{in}$ with SHCM-PWM.

The SHCM-PWM techniques of the subject invention can be applied to any grid voltage levels. A CHB prototype of the subject invention was fabricated, as shown in FIG. 15. The CHB prototype had the same circuitry as used in the simulations and the same parameters as shown in TABLE I and II. The prototype was tied to a utility grid with open-loop control to validate the modulation techniques of the subject invention. A TMS320F28335 digital signal controller was used in the experiments. As can be seen in FIG. 16(a) and FIG. 16(b), the actual utility grid had significant voltage harmonics and the function block shows how open loop control was used in the prototype. The input parameters $\Delta\theta_{R-G}$, which is the phase between the fundamental of CHB voltage and grid voltage, and $M_a$, which is the modulation index as previously defined, were used to achieve power control. FIGS. 17(a) and (b) show the measured time domain waveforms with a 1.93 modulation index and a unity power factor using SHE-PWM and SHCM-PWM of the subject invention, respectively. FIG. 17(c) shows the measured harmonics for $I_{in}$ with SHE-PWM. For the same reason as the simulations, SHE-PWM can only eliminate harmonics up to $17^{th}$ order. The $19^{th}$, $25^{th}$ and $41^{st}$ harmonics are higher than the limits. The measured TDD is 3.58%. On the other hand, as shown in FIG. 17(d), the current harmonics of SHCM-PWM can meet the limits up to the 100th order and its 3.53% TDD is smaller than the 5% TDD limit.

Figure 18:
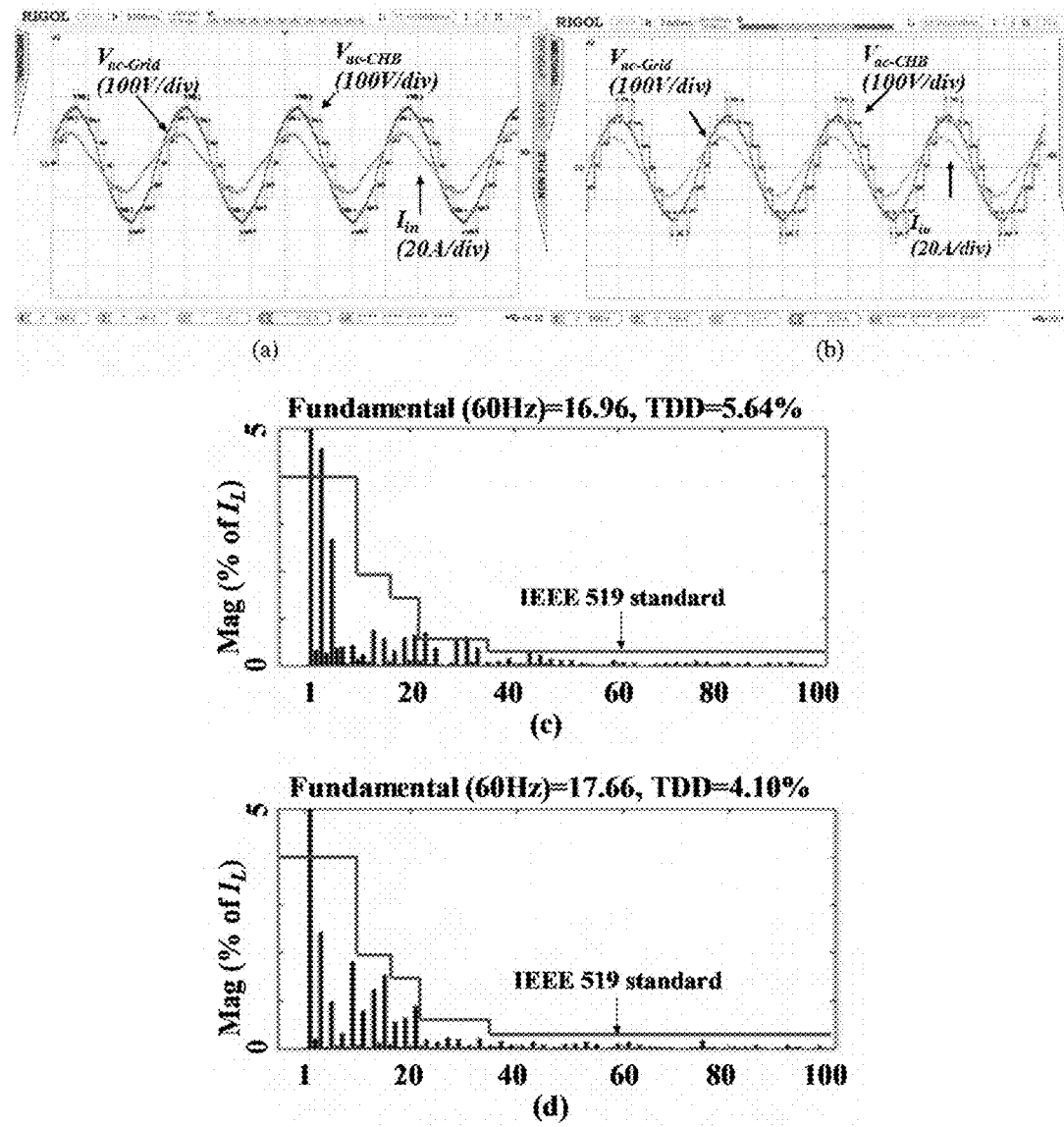
FIG. 18 shows experimental results for SHM-PWM and SHCM-PWM on a grid tied CHB rectifier when $M_a$=2.16: (a) $V_{ac\text{-}Grid}$, $V_{ac\text{-}CHB}$ and $I_{in}$ with SHM-PWM, (b) $V_{ac\text{-}Grid}$, $V_{ac\text{-}CHB}$, and $I_{in}$ with SHCM-PWM, (c) the harmonic spectrum of $I_{in}$ with SHM-PWM, and (d) the harmonic spectrum of $I_{in}$ with SHCM-PWM.

FIGS. 18(a) and (b) show the $V_{ac-Grid}$, $V_{ac-CHB}$, and $I_{in}$ with $M_a=2.16$ and a 0.89 leading power factor for SHM-PWM and SHCM-PWM of the subject invention, respectively. FIG. 18(c) shows the current harmonic waveform of the SHM-PWM technique. It can be seen that the $3^{rd}$, $23^{rd}$, $31^{st}$ and $43^{rd}$ order current harmonics cannot meet these limits. Its 5.64% TDD cannot meet the 5% TDD limit either. In contrast, the current harmonics caused by the voltage harmonics of $V_{ac-Grid}$ can still be reduced with the proposed SHCM-PWM techniques of the subject invention, as shown in FIG. 18(d). It can be seen that all current harmonic distortions are within the IEEE-519 limits. The measured TDD was 4.1%, which also meets the 5% limit.

Example 2

Figure 19A:
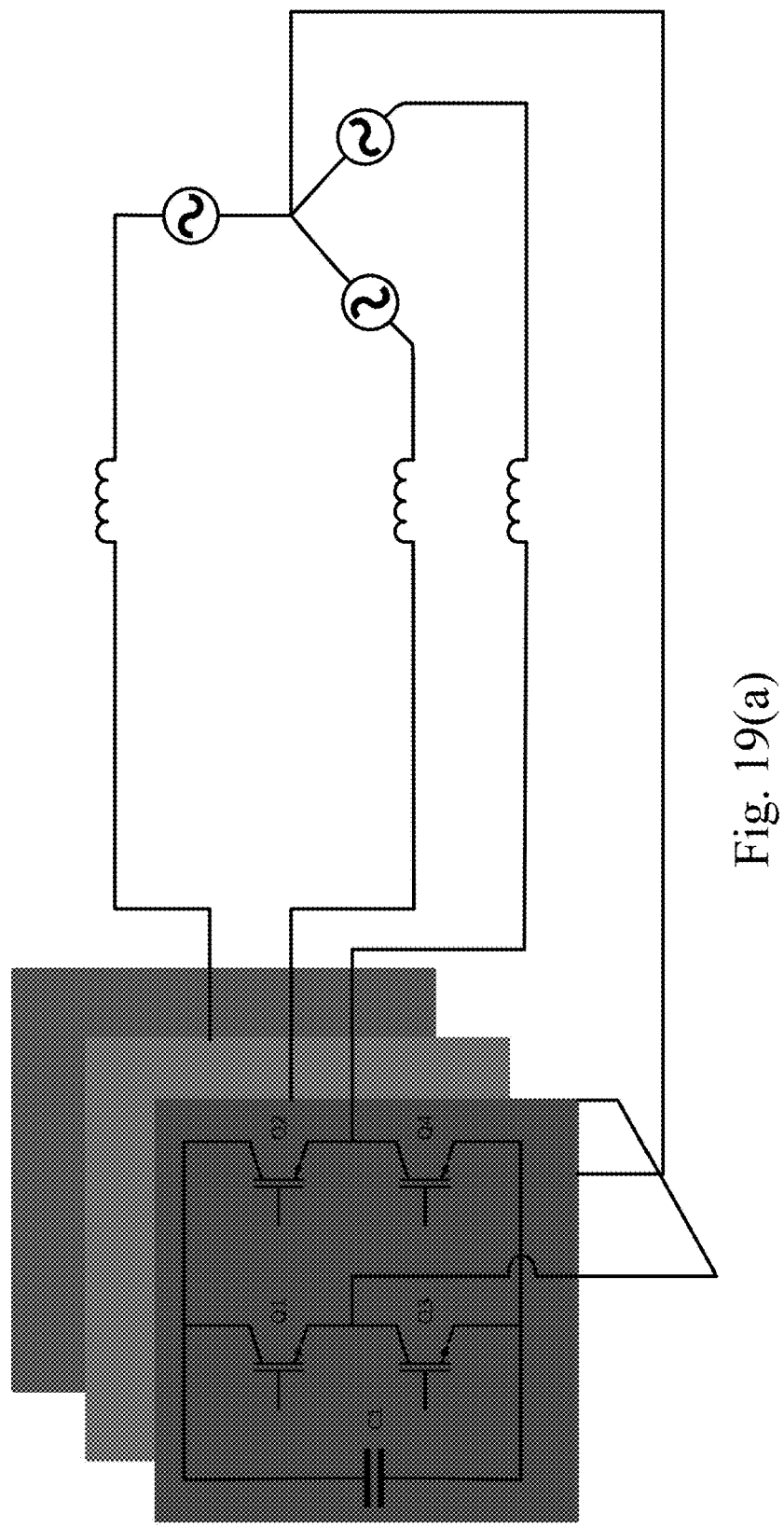
FIG. 19(a) shows a grid-tied converter according to an embodiment of the subject invention.
Figure 19B:
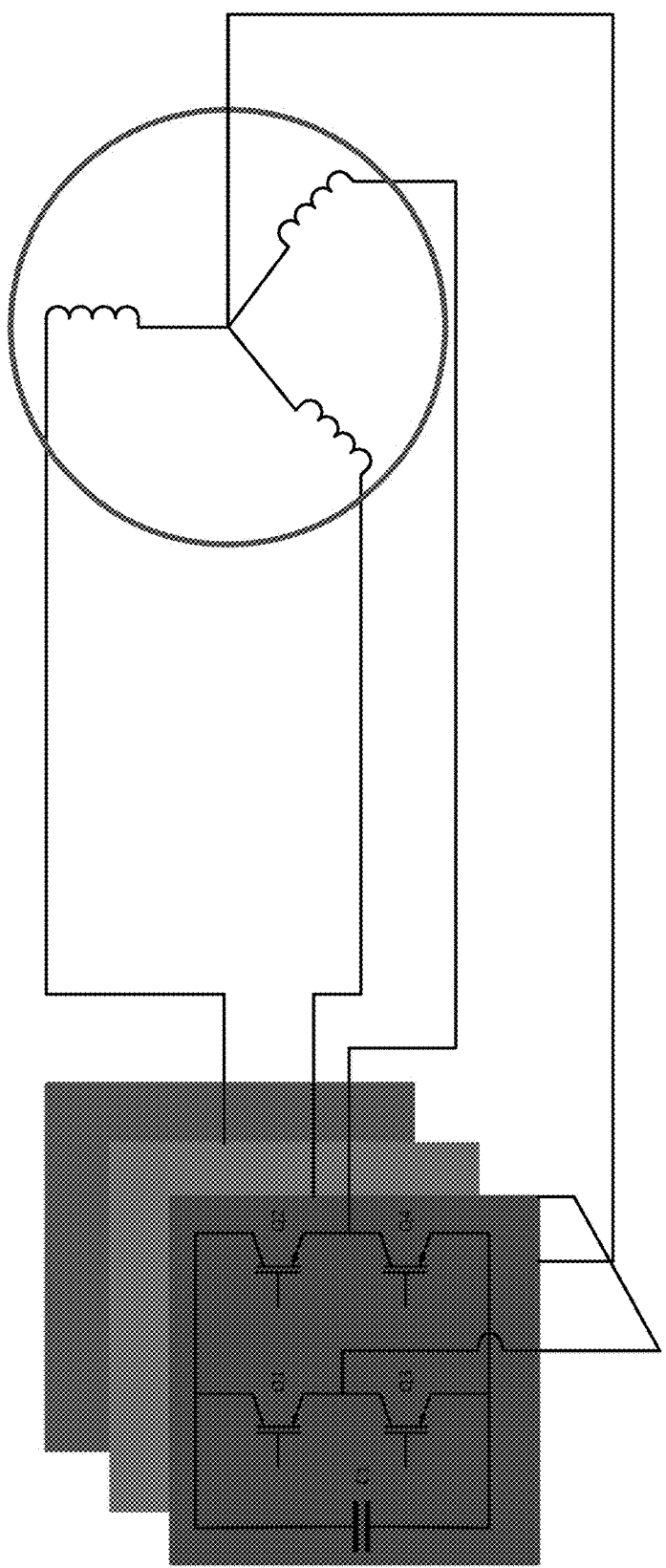
FIG. 19(b) shows a three-phase asynchronous motor according to an embodiment of the subject invention.
Figure 19C:
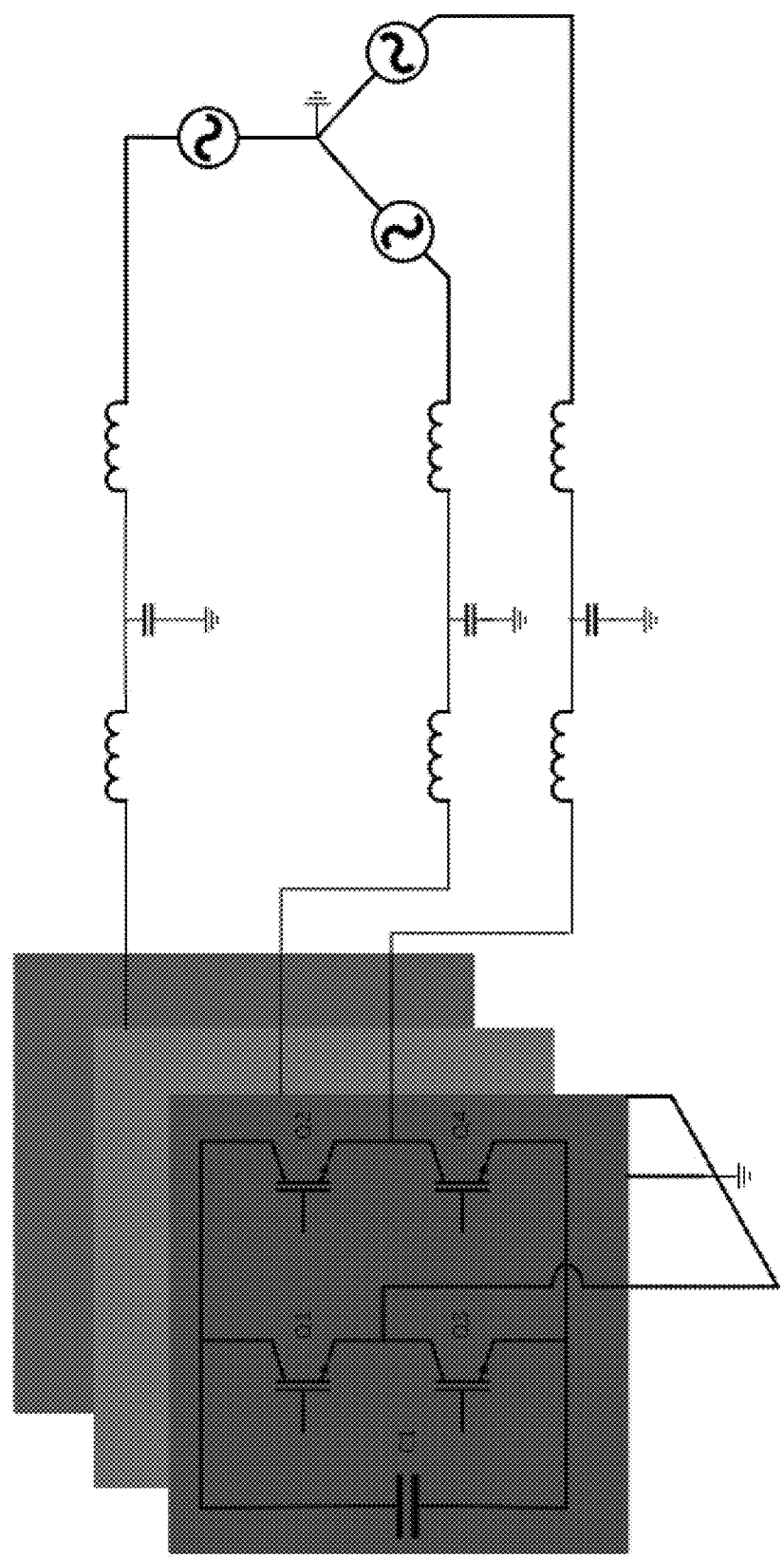
FIG. 19(c) shows a filter according to an embodiment of the subject invention.

FIGS. 19(a)-19(c) show another example according to an embodiment of the subject invention. FIG. 19(a) shows a grid-tied converter that is used in a selective harmonic current mitigation pulse width modulation (SHCM-PWM) unit. Referring to FIG. 19(a), the grid-tied converter provides high efficiency and high dynamic performance. The grid-tied converter further includes inductors $L_A$, $L_B$, and $L_C$ connected to a grid such as Neutral Point Clamped (NPC) and Flying Capacitor (FC).

FIG. 15(b) shows a three-phase asynchronous motor according to an embodiment of the subject invention. The three-phase asynchronous motor incorporating the present invention improves the dynamic performance in drive application using the three-phase asynchronous motor. The motor can be a single phase asynchronous motor.

FIG. 15(c) shows a filter according to an embodiment of the subject invention. The filter of FIG. 15(c) improves dynamic performance in any kind of passive filter. The filter includes any kind of passive filters including an L filter, an LC filter, and an LCL filter.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] S. Khomfoi, and L. M. Tolbert, "Multilevel Power Rectifiers", Power Electronics Handbook, The University of Tennessee, Department of Electrical and Computer Engineering, Knoxville, Tenn., USA.

[2] M. S. A. Dahidah, G. Konstantinou, V. G. Agelidis, "A Review of Multilevel Selective Harmonic Elimination PWM: Formulations, Solving Algorithms, Implementation and Applications," *IEEE Trans. Power Electron.*, vol. 30, no. 8, pp. 4091-4106, August 2015.

[3] S. Wang, R. Crosier and Y. Chu, "Investigating the power architectures and circuit topologies for megawatt superfast electric vehicle charging stations with enhanced grid support functionality," *IEEE Conf. Intl. Electric Vehicle (IEVC)*, pp. 1-8, April 2012.

[4] A. Moeini, H. Iman-Eini, A. Marzoughi, "DC link voltage balancing approach for cascaded H-bridge active rectifier based on selectiveharmonic elimination-pulse width modulation," *IET Power Electronics*, vol. 8, no. 4, pp. 583-590, April 2015.

[5] H. Zhao, T. Jin, S. Wang and L. Sun, "A Real-Time Selective Harmonic Elimination Based on A Transient-free, Inner Closed-Loop Control for Cascaded Multilevel Inverters," *IEEE Trans. Power Electron.* vol. 31, no. 2, pp. 1000-1014, February 2016.

[6] M. Sharifzade; H. Vahedi; R. Portillo; M. Khenar; A. Sheikholeslami; L. Franquelo; K. Al-Haddad, "Hybrid SHM-SHE Pulse Amplitude Modulation for High Power Four-Leg Inverter," *IEEE Trans. Ind. Electron.* vol. 63, no. 11, pp. 7234-7242, November 2016.

[7] C. Buccella, C. Cecati, M. G. Cimoroni and K. Razi, "Analytical Method for Pattern Generation in Five-Level Cascaded H-Bridge Inverter Using Selective Harmonic Elimination," *IEEE Trans. Ind. Electron.*, vol. 61, no. 11, pp. 5811-5819, November 2014.

[8] S. R. Pulikanti, G. Konstantinou and V. G. Agelidis, "Hybrid Seven-Level Cascaded Active Neutral-Point-Clamped-Based Multilevel Converter Under SHE-PWM," *IEEE Trans. Ind. Electron.*, vol. 60, no. 11, pp. 4794-4804, November 2013.

[9] L. G. Franquelo, J. Napoles, R. C. P. Guisado, J. I. Leon, and M. A. Aguirre, "A Flexible Selective Harmonic Mitigation Technique to Meet Grid Codes in Three-Level PWM Rectifiers" *IEEE Trans. Ind. Electron.*, vol. 54, no. 6, pp. 3022-3029, December 2007.

[10] J. Napoles, A. J. Watson, J. J. Padilla, J. I. Leon, L. G. Franquelo, P. W. Wheeler, M. A. Aguirre, "Selective Harmonic Mitigation Technique for Cascaded H-Bridge Rectifiers With Nonequal DC Link Voltages," *IEEE Trans. Ind. Electron.*, vol. 60, no. 5, pp. 1963-1971, May 2013.

[11] A. Marzoughi, H. Imaneini, and A. Moeini, "An optimal selective harmonic mitigation technique for high power rectifiers," *Intl. J Elec. Power*, vol. 49, pp. 34-39, July 2013.

[12] J. Napoles, J. I. Leon, R. Portillo, L. G. Franquelo and M. A. Aguirre, "Selective Harmonic Mitigation Technique for High-Power Converters," *IEEE Trans. on Ind. Electron.*, vol. 57, no. 7, pp. 2315-2323, July 2010.

[13] Watson, A. J.; Wheeler, P. W.; Clare, J. C., "A Complete Harmonic Elimination Approach to DC Link Voltage Balancing for a Cascaded Multilevel Rectifier," *IEEE Trans. Ind. Electron.*, vol. 54, no. 6, pp. 2946-2953, December 2007.

[14] M. Dabbaghjamanesh, A. Moeini, M. Ashkaboosi, P. Khazaei, K. Mirzapalangi, "High Performance Control of Grid Connected Cascaded H-Bridge Active Rectifier Based on Type II-Fuzzy Logic Controller with Low Frequency Modulation Technique," *Intl. J. Electri. and Comp. Eng. (IJECE)*, Vol. 6, No. 2, pp. 484-494, April 2016.

[15] M. Najjar, A. Moeini, M. K. Bakhshizadeh, F. Blaabjerg and S. Farhangi, "Optimal Selective Harmonic Mitigation Technique on Variable DC Link Cascaded H-Bridge Converter to Meet Power Quality Standards," *IEEE J. Emerg. and Sel. Top. Power Electron.*, vol. 4, no. 3, pp. 1107-1116, September 2016.

[16] V. G. Agelidis, A. I. Balouktsis and C. Cossar, "On Attaining the Multiple Solutions of Selective Harmonic Elimination PWM Three-Level Waveforms Through Function Minimization," *IEEE Trans. Ind. Electron.*, vol. 55, no. 3, pp. 996-1004, March 2008.

[17] V. G. Agelidis, A. I. Balouktsis and M. S. A. Dahidah, "A Five-Level Symmetrically Defined Selective Harmonic Elimination PWM Strategy: Analysis and Experimental Validation," *IEEE Trans. Power Electron.*, vol. 23, no. 1, pp. 19-26, Jan. 2008.

[18] IEEE Std 519, IEEE Recommended Practices and Requirements for Harmonic Control in Electrical Power Systems, New York.

[19] A. Moeini and S. Wang, "Asymmetric Selective Harmonic Elimination Technique using Partial Derivative for Cascaded Modular Active Rectifiers Tied to a Power Grid with Voltage Harmonics." *IEEE-APEMC*, May 2016.

[20] M. Reyes-Sierra, and C A C. Coello. "Multi-objective particle swarm optimizers: A survey of the state-of-the-art." *Intl. J. Comput. Intelligence Res.* 2. pp. 287-308, March 2006.

What is claimed is:

1. A method of selective harmonic current mitigation pulse width modulation (SHCM-PWM), the method comprising:

determining parameters including RMS grid voltage ($V_{ac\text{-}Grid\text{-}1}$), converter maximum demand load current ($I_L$), and grid voltage frequency ($\omega$), initial values for converter switching transitions in each quarter period (K), and converter inductance ($L_T''$);

determining the dc link voltage of each cell ($V_{dc}$) and the number of CHB converter cells (i) using the $V_{ac\text{-}Grid\text{-}1}$ and $I_L$ and equation $$\frac{4V_{dc} \times i}{\pi} > \text{Max}(V_{ac\text{-}Grid\text{-}1});$$

determining the required inductance based on equation (19) ($L_T$) from $$L_T \geq \frac{|V_{ac\text{-}Grid\text{-}35}|}{|35\omega C_{35} I_L|};$$

determining the number of harmonics that can be eliminated using the number of converter switching transitions in each quarter period (K);

using SHE-PWM equations to obtain an initial number harmonics that need to be controlled;

having values for K, $V_{ac\text{-}Grid\text{-}1}$, $I_L$, $V_{dc}$, $\omega$, and h, obtaining the required inductance ($L_T'$) using equation $$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L};$$

ensuring that the designed inductance is greater than or equal to $L_T$ and $L_T'$ in both of equation $$L_T \geq \frac{|V_{ac\text{-}Grid\text{-}35}|}{|35\omega C_{35} I_L|}$$

and equation $$L_T' \geq \frac{|V_{ac\text{-}CHB\text{-}h}|_{max} + |V_{ac\text{-}Grid\text{-}h}|}{\omega h C_h I_L} = \frac{4V_{dc}K}{\omega h^2 C_h I_L \pi} + \frac{|V_{ac\text{-}Grid\text{-}h}|}{\omega h C_h I_L};$$

determining the minimum inductance using equation (19)

$$L_T \geq \frac{|V_{ac\text{-}Grid\text{-}35}|}{|35\omega C_{35} I_L|};$$

determining the required inductance ($L_T'$) using K, h, and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

using $L_T'$ and the other parameters, determining the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases};$$

wherein, if there are solutions for the SHCM-PWM with a highest number of controlled harmonics h, then increase h by 2 (h=h+2) and, with the new h, determining a new $L_T'$ using equation (23)

$$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L}$$

and solving equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;
wherein, if there are no solutions for equation set (25) of SHCM-PWM with the highest number of harmonics h that must be controlled, reducing h by two (h=h−2) and recalculating $L_T'$ using equation (23);
comparing the obtained inductance $L_T'$ with $L_T$ in equation (19) and determining if the $L_T'$ is lower than $L_T$ in equation (19);
obtaining all of the required parameters including switching transitions of SHCM-PWM (K) and the maximum number of harmonics that should be met (h);
wherein, if the $L_T'$ is greater than $L_T$, the method further comprises determining whether the value of $$\frac{L_T'' - L_T'}{L_T''}$$

is higher or lower than a predefined threshold δ and, if the value of $$\frac{L_T'' - L_T'}{L_T''}$$

is lower than δ, then determining the designed inductance as $L_T'$ (and the other parameters can be determined); and wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K), and using SHE-PWM equations to again obtain the number harmonics that need to be controlled.

2. A method of selective harmonic current mitigation pulse width modulation (SHCM-PWM), the method comprising:
determining parameters including RMS grid voltage ($V_{ac-Grid-1}$), converter maximum demand load current ($I_L$), and grid voltage frequency (ω), initial values for converter switching transitions in each quarter period (K), and converter inductance ($L_T''$);
determining the dc link voltage of each cell ($V_{dc}$) and the number of CHB converter cells (i) using the $V_{ac-Grid-1}$ and $I_L$ and equation $$\frac{4V_{dc} \times i}{\pi} > \text{Max}(V_{ac-Grid-1});$$

determining the required inductance based on equation (19) ($L_T$) from $$L_T \geq \frac{|V_{ac-Grid-35}|}{|35\omega C_{35} I_L|};$$

determining the number of harmonics that can be eliminated using the number of converter switching transitions in each quarter period (K);
using SHE-PWM equations to obtain an initial number harmonics that need to be controlled;
having values for K, $V_{ac-Grid-1}$, $I_L$, $V_{dc}$, ω, and h, obtaining the required inductance ($L_T'$) using equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

ensuring that the designed inductance is greater than or equal to $L_T$ and $L_T'$ in both of equation $$L_T \geq \frac{|V_{ac-Grid-35}|}{|35\omega C_{35} I_L|}$$

and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

determining the minimum inductance using equation (19)

$$L_T \geq \frac{|V_{ac-Grid-35}|}{|35\omega C_{35} I_L|};$$

determining the required inductance ($L_T'$) using K, h, and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

using $L_T'$ and the other parameters, determining the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases};$$

wherein, if there are solutions for the SHCM-PWM with a highest number of controlled harmonics h, then increase h by 2 (h=h+2) and, with the new h, determine a new $L_T'$ using equation (23)

$$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

and solve equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;
comparing the obtained inductance $L_T'$ with $L_T$ in equation (19) and determining if the $L_T'$ is lower than $L_T$ in equation (19); and
obtaining all of the required parameters including switching transitions of SHCM-PWM (K) and the maximum number of harmonics that should be met (h).

3. The method according to claim 2, wherein $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

is solved using multi-objective particle swarm optimization.

4. The method according to claim 3, wherein the method is applied to a cascaded H-bridge multilevel active rectifier.

5. The method according to claim 2, wherein the method is applied to a cascaded H-bridge multilevel active rectifier.

6. The method according to claim 5, wherein, if there are no solutions for equation set (25) of SHCM-PWM with the highest number of harmonics h that must be controlled, then reduce h by two (h=h−2) and recalculate $L_T'$ using equation (23).

7. The method according to claim 6, further comprising comparing the obtained inductance $L_T'$ with $L_T$ in equation (19) and determining if the $L_T'$ is lower than $L_T$ in equation (19).

8. The method according to claim 7, wherein if the $L_T'$ is higher than $L_T$, determining whether the value of $$\frac{L_T'' - L_T'}{L_T''}$$

is higher or lower than a predefined threshold δ and, if the value of $$\frac{L_T'' - L_T'}{L_T''}$$

is lower than δ, determining the inductance $L_T'$.

9. The method according to claim 8, wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K); and using SHE-PWM equations to obtain an initial number harmonics that need to be controlled.

10. A method of selective harmonic current mitigation pulse width modulation (SHCM-PWM), the method comprising:
determining parameters including RMS grid voltage ($V_{ac-Grid-1}$), converter maximum demand load current ($I_L$), and grid voltage frequency (ω), initial values for converter switching transitions in each quarter period (K), and converter inductance ($L_T''$);
determining the dc link voltage of each cell ($V_{dc}$) and the number of CHB converter cells (i) using the $V_{ac-Grid-1}$ and $I_L$ and equation $$\frac{4V_{dc} \times i}{\pi} > \text{Max}(V_{ac-Grid-1});$$

determining the required inductance based on equation (19) ($L_T$) from $$L_T \geq \frac{|V_{ac-Grid-35}|}{|35\omega C_{35} I_L|};$$

determining the number of harmonics that can be eliminated using the number of converter switching transitions in each quarter period (K);

using SHE-PWM equations to obtain an initial number harmonics that need to be controlled;

having values for K, $V_{ac-Grid-1}$, $I_L$, $V_{dc}$, $\omega$, and h, obtaining the required inductance ($L_T'$) using equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

ensuring that the designed inductance is greater than or equal to $L_T$ and $L_T'$ in both of equation $$L_T \geq \frac{|V_{ac-Grid-35}|}{|35\omega C_{35} I_L|}$$

and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

determining the minimum inductance using equation (19)

$$L_T \geq \frac{|V_{ac-Grid-35}|}{|35\omega C_{35} I_L|};$$

determining the required inductance ($L_T'$) using K, h, and equation $$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L};$$

using $L_T'$ and the other parameters, determining the solutions of SHCM-PWM using equation set $$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases} ;$$

wherein, if there are solutions for the SHCM-PWM with a highest number of controlled harmonics h, then increase h by 2 (h=h+2) and, with the new h, determine a new $L_T'$ using equation (23)

$$L_T' \geq \frac{|V_{ac-CHB-h}|_{max} + |V_{ac-Grid-h}|}{\omega h C_h I_L} = \frac{4V_{dc}K}{\omega h^2 C_h I_L \pi} + \frac{|V_{ac-Grid-h}|}{\omega h C_h I_L}$$

and solve equation set (25)

$$\begin{cases} M_a = \cos\theta_1 - \cos\theta_2 + \cos\theta_3 \ldots + \cos\theta_k \\ \sqrt{\left(\frac{I_{in-3}}{I_1}\right)^2 + \left(\frac{I_{in-5}}{I_1}\right)^2 + \ldots + \left(\frac{I_{in-h}}{I_1}\right)^2 + \ldots} \leq C_{TDD} \\ \frac{|V_{ac-Grid-h}| + |V_{ac-CHB-h}|}{|\omega h L_T I_L|} \leq C_h, h = 3, 5, 7, \ldots \end{cases}$$

using the new parameters;

comparing the obtained inductance $L_T'$ with $L_T$ in equation (19) and determining if the $L_T'$ is lower than $L_T$ in equation (19);

obtaining all of the required parameters including switching transitions of SHCM-PWM (K) and the maximum number of harmonics that should be met (h);

storing the all of the required parameters into a lookup table;

providing a control signal from the lookup table to a gate signal driver; and providing a gate signal from the gate signal driver to a cascaded H-bridge multilevel active rectifier.

11. The method according to claim 10, the cascaded H-bridge multilevel active rectifier being connected a grid through an inductor.

12. The method according to claim 11, the grid being at least one of a neutral point clamped (NPC) and a flying capacitor (FC).

13. The method according to claim 10, the cascaded H-bridge multilevel active rectifier being connected to a motor.

14. The method according to claim 13, the motor being at least one of a three-phase asynchronous motor and a single phase asynchronous motor.

15. The method according to claim 10, the cascaded H-bridge multilevel active rectifier being connected to a filter.

16. The method according to claim 15, the filter being at least one of an L filter, an LC filter, and an LCL filter.

17. The method according to claim 10, wherein, if there are no solutions for equation set (25) of SHCM-PWM with the highest number of harmonics h that must be controlled, then reduce h by two (h=h−2) and recalculate $L_T'$ using equation (23).

18. The method according to claim 17, further comprising comparing the obtained inductance $L_T'$ with $L_T$ in equation (19) and determining if the $L_T'$ is lower than $L_T$ in equation (19).

19. The method according to claim 18, wherein if the $L_T'$ is higher than $L_T$, determining whether the value of $$\frac{L_T'' - L_T'}{L_T''}$$

is higher or lower than a predefined threshold $\delta$ and, if the value of $$\frac{L_T'' - L_T'}{L_T''}$$

is lower than $\delta$, determining the inductance $L_T'$.

20. The method according to claim 19, wherein if $$\frac{L_T'' - L_T'}{L_T''}$$

is greater than δ, the method further comprises increasing the switching transitions K by one (to K+1) and substituting $L_T''$ for $L_T'$ and iterating again the steps of: determining the number of harmonics that can be eliminated using the number of converter switching transitions in each quarter period (K); and using SHE-PWM equations to obtain an initial number harmonics that need to be controlled.

* * * * *